(12) United States Patent
Ramakrishnan et al.

(10) Patent No.: US 10,329,903 B2
(45) Date of Patent: Jun. 25, 2019

(54) METHODS OF CHARACTERIZING EARTH FORMATIONS USING PHYSIOCHEMICAL MODEL

(71) Applicant: SCHLUMBERGER TECHNOLOGY CORPORATION, Sugar Land, TX (US)

(72) Inventors: Terizhandur S. Ramakrishnan, Boxborough, MA (US); Yusuf Bilgin Altundas, Burlington, MA (US); Nikita Chugunov, Arlington, MA (US); Romain De Loubens, Paris (FR); Francois B. Fayard, Four (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 286 days.

(21) Appl. No.: 14/777,131

(22) PCT Filed: Oct. 4, 2013

(86) PCT No.: PCT/US2013/063425
§ 371 (c)(1),
(2) Date: Sep. 15, 2015

(87) PCT Pub. No.: WO2014/143166
PCT Pub. Date: Sep. 18, 2014

(65) Prior Publication Data
US 2016/0040531 A1 Feb. 11, 2016

Related U.S. Application Data

(60) Provisional application No. 61/790,398, filed on Mar. 15, 2013.

(51) Int. Cl.
*E21B 49/00* (2006.01)
*G01V 1/30* (2006.01)
(Continued)

(52) U.S. Cl.
CPC ............ *E21B 49/00* (2013.01); *G01V 1/30* (2013.01); *G01V 1/40* (2013.01); *G01V 1/50* (2013.01);
(Continued)

(58) Field of Classification Search
CPC .. E21B 49/00; E21B 41/0092; G06F 17/5009; G01V 3/38; G01V 3/32; G01V 1/40
See application file for complete search history.

(56) References Cited

U.S. PATENT DOCUMENTS 5,497,321 A 3/1996 Ramakrishnan et al.
6,061,634 A 5/2000 Belani et al.
(Continued)

OTHER PUBLICATIONS

Altundas, Y. B. et al., "Retardation of CO2 Caused by Capillary Pressure Hysteresis: A New CO2 Trapping Mechanism", SPE 139641, Society of Petroleum Engineers, 2011, pp. 784-794.
(Continued)

*Primary Examiner* — Changhyun Yi

(57) ABSTRACT

Embodiments include constructing a reservoir model of an earth formation. The method may also include selecting a predetermined set of fundamental parameters to describe the earth formation and assigning initial values for the predetermined set of fundamental parameters for each of the plurality of layers. The method may include using the initial values for each of the plurality of layers. The method may include computing physical-response-relevant properties as a function of space and time for each of the plurality of layers using the solutions and then computing tool responses using the physical-response-relevant properties. The method may include installing an electrode array between an insulation portion of a metal casing provided in a borehole and a physical formation and obtaining formation measurement information from the electrode array, comparing the forma-
(Continued)

tion measurement information to the computed tool response to obtain an error signal and modifying the initial values in an iterative process.

20 Claims, 4 Drawing Sheets

(51) Int. Cl.
```
G01V 1/40        (2006.01)
G01V 3/32        (2006.01)
G01V 1/50        (2006.01)
G01V 3/38        (2006.01)
```
(52) U.S. Cl.
CPC .............. *G01V 3/32* (2013.01); *G01V 3/38* (2013.01); *G01V 2210/624* (2013.01); *G01V 2210/644* (2013.01)

(56) References Cited

U.S. PATENT DOCUMENTS

| | | | |
|---|---|---|---|
| 6,088,656 A * | 7/2000 | Ramakrishnan | G01V 3/20 702/13 |
| 7,221,158 B1 | 5/2007 | Ramakrishnan | |
| 7,555,390 B2 | 6/2009 | Ramakrishnan | |
| 8,452,539 B2 | 5/2013 | Chugunov et al. | |
| 8,548,785 B2 | 10/2013 | Chugunov et al. | |
| 9,542,508 B2 | 1/2017 | Altundas et al. | |
| 2003/0070480 A1* | 4/2003 | Herron | G01V 11/00 73/152.14 |
| 2004/0225441 A1 | 11/2004 | Tilke et al. | |
| 2006/0212225 A1* | 9/2006 | Bachrach | G01V 1/306 702/14 |
| 2011/0191029 A1* | 8/2011 | Jalali | E21B 49/087 702/6 |
| 2013/0110483 A1 | 5/2013 | Chugunov et al. | |

OTHER PUBLICATIONS

Ambegaokar, V. et al., "Hopping Conductivity in Disordered Systems", Physical Review B, 1971, 4, pp. 2612-2620.
Arakawa, K. et al., "Statistical Analysis of E-Separating Nonlinear Digital Filters", Electronics and Communications in Japan, Part I, 1983, 66(1), pp. 10-18.
Archie, G.E., "The Electrical Resistivity Log as an Aid in Determining Some Reservoir Characteristics", Transactions of the AIME, 1942, pp. 54-62.
Brenner, H. "Is the Tracer Velocity of a Fluid Continuum Equal to its Mass Velocity?", Physical Review E-Statistical, Nonlinear, and Soft Matter Physics, 2004, 70, 10 pages.
Brooks, R. H. et al., "Properties of Porous Media Affecting Fluid Flow", Journal of the Irrigation and Drainage Division, 1966, 92(2), pp. 61-88.
Clavier, C. et al., "The Theoretical and Experimental Bases for the Dual-Water Model for the Interpretation of Shaly Sands", Society of Petroleum Engineers, 1984, 24(2), pp. 153-168.
Gao, G. et al., "Joint Inversion of Cross-Well Electromagnetic and Seismic Data for Reservoir Petrophysical Parameters", SPE 135057, Society of Petroleum Engineers, 2010, pp. 1-15.
Ingerman, D., et al, "Optimal Finite Difference Grids and Rational Approximations of the Square Root in Elliptic Problems", Communications on Pure and Applied Mathematics, 2000, 53(8), pp. 1039-1066.
Johnson, D. L. et al., "New Pore-Size Parameter Characterizing Transport in Porous Media", Physical Review Letters, 1986, 57(20), pp. 2564-2567.
Katz, A. J. et al., Quantitative Prediction of Permeability in Porous Rock, Physical Review B, 1986, 34, pp. 8179-8181.
Killough, J. E., "Reservoir Simulation with History-Dependent Saturation Functions", SPE1506, Society of Petroleum Engineers, 1976, pp. 37-48.
Kuchuk, F. J. et al., "Determination of in Situ Two-Phase Flow Properties Through Downhole Fluid Movement Monitoring", SPE116068-MS, Society of Petroleum Engineers SPE 116068-PA, 2010, 13(4), pp. 575-587.
Land, C. S., "Calculation of Imbibition Relative Permeability for Two and Three Phase Flow From Rock Properties", Society of Petroleum Engineers, 1968, pp. 149-156.
Landauer, R., "Electrical Conductivity in Inhomogeneous Media", American Institute of Physics, 1978, 40(2), pp. 2-45.
Macmullin, R. B. et al., "Characteristics of Porous Beds and Structures", AIChE Journal, 1956, 2(3), pp. 393-403.
Madsen, K. et al., "Methods for non-linear Least Squres Problems", 2nd Edition, Informatics and Mathematical Modeling, Technical University of Denmark, 2004, 30 pages.
Moore, D. et al., "On Nonlinear Filters Involving Transformation of the Time Variable", IEEE Transactions on Information Theory, 1973, 19(4), 415-422.
Müller, N. et al., "Time-Lapse Carbon Dioxide Monitoring With Pulsed Neutron Logging", International Journal of Greenhouse Gas Control, 2007, 1(4), pp. 456-472.
Oren, P. E., "Process Based Reconstruction of Sandstones and Prediction of Transport Properties", Transport in Porous Media, 2002, 46 (2), pp. 311-343.
Plasek, R. E. et al., "Improved Pulsed Neutron Capture Logging With Slim Carbon-Oxygen Tools: Methodology", SPE30958, Society of Petroleum Engineers, 1995, pp. 729-743.
Ramakrishnan, T. S. et al., "A Model-Based Interpretation Methodology for Evaluation Carbonate Reservoirs", SPE 71704-MS, Society of Petroleum Engineers, 2001, pp. 1-15.
Ramakrishnan, T. S. et al., "A Petrophysical and Petrographic Study of Carbonate Cores from the Thamama Formation", SPE49502, Society of Petroleum Engineers, 1998, pp. 1-11.
Ramakrishnan, T. S. et al., "Water-Cut and Fractional-Flow Logs from Array Induction Measurements", SPE Reservoir Evaluation & Engineering, 1999, 2(1), pp. 85-94.
Ramakrishnan, T. S. et al., "Effect of Capillary Number on the Relative Permeability Function for Two-Phase Flow in Porous Media", Powder Technolgy, 1986, 48(2), pp. 99-124.
Ramakrishnan, T. S. et al, "Formation Producibility and Fractional Flow Curves from Radial Resistivity Variation Caused by Drilling Fluid Invasion", 1997, Physics of Fluids, 1997, 9(4), pp. 833-844.
Ramakrishnan, T. S. et al., "Two-Phase Distribution in Porous Media: An Application of Percolation Theory" International Journal of Multiphase Flow, 1986, 12(3), pp. 357-388.
Revil, A. et al., "Influence of the Electrical Diffuse Layer and Microgeometry on the Effective Ionic Diffusion Coefficient in Porous Media", Geophysical Research Letters, 1996, 23(15), pp. 1989-1992.
Sakurai, S. et al., "Monitoring Saturation Changes for CO2 Sequestration: Petrophysical Support of the Frio Brine Pilot Experiment", 2006 Petrophysics 47(6), pp. 483-496.
Waxman, M.H. et al., "Electrical Conductivities in Oil-Bearing Shaly Sands", Society of Petroleum Engineers, 1968, pp. 107-122.
Waxman, M. H. et al., Electrical Conductivities in Shaly Sands-I. the Relation Between Hydrocarbon Saturation and Resistivity Index; II. The Temperature Coefficient of Electrical Conductivity, SPE 4094-PA, Journal of Petroleum Technology, 1974, pp. 213-225 (1974).
Wilt, M. J. et al., "Electromagnetic Methods for Development and Production: State of the Art", The Leading Edge, 1998, 17, pp. 487-490.
Zhan, et al., "Characterization of Reservoir Heterogeneity Through Fluid Movement Monitoring With Deep Electromagnetic and Pressure Measurements", SPE 116328-PA, Reservoir Evaluation & Engineering, 2010, pp. 509-522.
Search Report and Written Opinion of International Application No. PCT/US2013/063425 dated Jan. 9, 2014, 9 pages.

* cited by examiner

METHODS OF CHARACTERIZING EARTH FORMATIONS USING PHYSIOCHEMICAL MODEL

CROSS-REFERENCE TO RELATED APPLICATION

This application is a non-provisional patent application that claims benefit of U.S. Provisional Patent Application Ser. No. 61/790,398 filed Mar. 15, 2013 entitled "Physiochemical Model Based Inversion of Multisensor Data" which is hereby incorporated by reference herein in its entirety.

BACKGROUND

1. Field

This application relates to methods of characterizing earth formations by combining and analyzing data from many sources. The sources are the responses to different geometrical and physical properties of the reservoir or different combinations thereof. This application more particularly relates to methods of characterizing formations by utilizing a combination of measurements of different formation exploration tools via a compact inversion parameter set that make use of underlying laws of motion, rules of thermodynamics, and principles related to responses from stimuli.

2. State of the Art

The ability to simulate the movement of the fluid injected into a formation and to predict the movement of multiple phases and the components therein is useful both in the process of producing hydrocarbons from a formation and in the process of quantifying the capacity and containment of underground storage of $CO_2$. For reservoir characterization, owing to spatial sparsity of data, geostatistical methods that propagate near well-bore information or outcrop variograms are usually employed. But by the very nature of the approach, the statistics are based on limited information, use few physical constraints, and are themselves prone to error. Essentially, data are created. To a large extent, the consequential lack of reservoir performance predictability is common to $CO_2$ sequestration and oil and gas production.

For reservoir flow prediction, in addition to near wellbore uncertainty, inter-well properties are obtained through interpolation or geostatistics, but these have large error. It is often thought that with monitoring wells, and with multiple modes of monitoring, a better understanding of the reservoir is possible. Multi-well data, while useful, provides supplementary fluid movement data. But the same problems encountered in single-well data persist. Each of the multiple stimuli induces its own response, and at best only partial consistency is imposed. Furthermore, the presence of a monitoring well-bore and the completions within it affect the very displacement that one is interested in quantifying. Thus, any inference from a near well-bore measurement must account for the altered displacement and/or property profiles, which presents a difficult task. For all of the above-mentioned reasons, inversion remains ill-posed. Indeed, the inability to enforce consistency between inversions of response to one stimulus with another is problematic in reservoir flow characterization. Given the complexity of natural porous materials, it is unrealistic to expect universality of petrophysical relationships.

One problem in reservoir characterization is the lack of spatially distributed data. Another problem is that the data are often indirect, and so are responses, each one of which being governed by its own physics that dictates cause and effect relationship. As an example, consider displacement of one fluid by another in a porous medium. Replacement causes a change in saturation. Assuming that the displacing fluid is non-conductive, and has a neutron capture cross-section different from that of the displaced fluid, and further assuming that the displacing and the displaced fluids are immiscible, the displacement process then alters the behavior of the reservoir to a stimulus that involves current injection, or, neutron pulses. When the densities are different, the gravitational attraction will also change, and the acoustic responses will likely also be altered due to effective compressional and shear velocity changes. During displacement, saturation changes also alter overall hydraulic resistance to flow due to relative permeability and viscosity changes. Therefore, the pressure response for a fixed flow rate would change.

Traditional interpretation methods essentially treat each type of data on its own merit. Well-test analysis infers permeability, skin, and flow barriers from pressure data. Inter-well electromagnetic data is used to invert for resistivity pixels or voxels. Change in the acceleration due to gravity with respect to z or the vertical height, may be similarly utilized to get a coarse distribution of densities. As a result, a poorly resolved density distribution is obtained without concern for physical plausibility with respect to displacement physics or the relevant thermodynamics. The consequence of such disparate approaches is that regularized inversion of apparently independent data may violate the laws governing motion of fluids. For example, tomographic inversion of gravity data may lead to a heavier fluid placed above a lighter fluid without regard to Rayleigh-Taylor instability.

More recently, some work has been done in attempting to account for and reconcile different types of data during analysis of a formation to as to avoid unacceptable solutions. For example, in Ramakrishnan, T. S. and Wilkinson, D., *Formation Producibility and Fractional Flow Curves from Radial Resistivity Variation Caused by Drilling Fluid Invasion*. Phys. Fluids 9(4), 833-844 (1997), and in Ramakrishnan, T. S. and Wilkinson, D., *Water-Cut and Fractional-Flow Logs from Array Induction Measurements*. SPE Reservoir Eval. Eng. 2 (1), 85-94 (1999) the concept of inverting electrical responses directly in terms of the underlying multiphase flow properties was proposed. A multicomponent-multiphase fluid mechanics model was used, which when combined with a petrophysical relation allowed for the computation of a conductivity profile. With the tool characteristic response to a conductivity profile included in the forward predictive calculations, comparison with the data obtained within a wellbore was possible. By inverting the measured conductivity responses in terms of a fluid mechanically relevant parameter set, quantities also relevant to future flow performance were obtained. In contrast to continuous logging, on a formation interval length scale, U.S. Pat. No. 6,061,634 to Belani, et al., proposed combining pressure measurements with electrical responses so that a flow model based inversion could be carried out. Sharpness in the inverted results, as imposed by the transport model originating from fluid mechanical considerations could be obtained.

It is also known to allow for current injection through a series of electrodes, with voltages measured simultaneously. The electrodes thus function as both a current source and a voltage pick-up. The actual field deployment and measurement in such an arrangement was illustrated by Kuchuk, et al., *Determination of In Situ Two-Phase Flow Properties Through Downhole Fluid Movement Monitoring*, SPE. Res.

Eval. Eng. 13 (4), 575-587 (2010), and Zhan, et al., *Characterization of Reservoir Heterogeneity Through Fluid Movement Monitoring With Deep Electromagnetic and Pressure Measurements*, SPE Res. Eval. Eng. 13, 509-522 (2010) where pressure-flowrate/voltage-current responses were inverted.

The integration of a multitude of data types for understanding anomalous responses in carbonate formations was described in U.S. Pat. No. 6,088,656 to Ramakrishnan et al., and in Ramakrishnan et al., *A Petrophysical and Petrographic Study of Carbonate Cores from the Thamama Formation*, 8th Abu Dhabi International Petroleum Exhibition and Conference, Abu Dhabi, UAE, SPE49502 (1998), as well as Ramakrishnan et al., *A Model-Based Interpretation Methodology for Evaluation Carbonate Reservoirs*, SPE Annual Technical Conference and Exhibition, SPE71704 (2001). Unlike sandstones, these responses were caused largely by microscopic heterogeneity. These references combined largely diverse responses in a somewhat sequential fashion in order to infer a few parameters related to the underlying pore arrangements such as inter- and intra-granular pore fractions, their length scales and vug fraction. These parameters applied to a matrix surrounded by previously identified fractures. With these, an attempt was made to invert for fractional flow behavior with the approach as given by previously referenced Ramakrishnan, T. S. and Wilkinson, D. (1999). This approach is only partially consistent given that the latter work assumes the pore structure to be unimodal for computing relative permeability functions. The sequential approach also assumed that the nuclear logs are largely processable without having a large sensitivity to multiple liquid phases; but mineralogy contributions are taken into account since they have a measurable impact on density and neutron responses.

The past work of partly sequential steps was tailored towards near wellbore logging in an oil-water environment where a fully integrated simultaneous inversion could be circumvented. Nuclear logs were processed first to infer mineralogy and porosity without having to account for filtrate invasion. Acoustic interpretation that is insensitive to pore fluid, e.g. shear modulus, was used to infer components of porosity. Very shallow logs (e.g. NMR, FMI) were presumed to be obtained in a fully invaded zone. Once pororsity components and pore sizes were inferred, resistivity interpretation was carried out using an invasion model. The separation of logs into those affected by fluids, and those that are not, and those that are sufficiently shallow that the underlying saturation distribution is unambiguously determined, works robustly for near wellbore interpretation. But this is not sufficiently general for deeper measurements. It is also ineffective in dealing with media where heterogeneities affect the measurements, and large scale structural or strata needs to be considered during inversion.

Integration of measurements by classifying them into near wellbore and deep reading data while satisfactory for many purposes, fails as a general purpose method because it does not honor all of the response characteristics associated with each measurement. Although historical work carried out an integration by characterizing pore geometry, the past work did not take into consideration the response behavior for each of the tools, and in particular did not consider gravity, capillarity and the multidimensionality of the displacement processes. Each depth was treated in its own merit, i.e., two and three dimensional effects on log responses went unaccounted.

More recent work has been proposed to integrate electromagnetic and seismic measurements by having a common porosity and saturation model. See, Gao, G. et al., *Joint Inversion of Cross-well Electromagnetic and Seismic Data for Reservoir Petrophysical Parameters*, SPE 135057 (2010). These models are based on commercially available numerical reservoir simulators that fail to capture wellbore and near boundary related near wellbore behavior correctly, and do not account for response relevant property variations relevant to responses in a thermodynamically consistent fashion.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, strata of a formation are described with a fundamental set of microscopic parameters such that quantities relevant to petrophysical responses at a continuum or macroscopic level can be derived from them. The number of parameters utilized to describe a formation is small, and property distributions are derived from first principles, thereby automatically imposing consistency.

In one aspect, disparate data are consistently integrated with an underlying physical model, such that shallow and deep measurements are treated without a need for distinction.

In one embodiment, multiple stimuli are treated by recognizing how they respond to representative pore level characteristics and the physical state of the constituents of the rock as opposed to just their macroscopic manifestations. Additional measurements then do not entail a prolific growth of parameters related to each type of measurement. As a result, the inverse problem is strongly model-based and well-posed, and regularization resulting in smoothed inversion is avoided.

In one aspect, combinations of measurements that have common parametrization enable the characterization of the formation from a multitude of data originating from quite different stimuli and response characteristics such as pressure, flow rates, compositions, voltage or current, neutron capture cross-section, acoustic and seismic wave propagation, and acceleration due to gravity treated by integrating mass, momentum, heat transport, and thermodynamics of multicomponent/multiphase materials along with the relevant measurement tool characteristics.

In one aspect, techniques are described that are equally applicable to oil reservoirs and $CO_2$ sequestration sites.

In one aspect, natural scaling relationships enable the reduction of the number of parameters available for isotropic media. Such relationships between petrophysical quantities are not easily constructed when the transport properties are anisotropic or when they are scaled. In one embodiment a procedure is provided wherein parameterization for such media is implemented seamlessly.

In one aspect, described embodiments do not bin measurements into high or low resolutions, and near or deep, but attempt to integrate the measurements in terms of the continuum level properties of the rock while honoring the response behavior of the measurement system. The relationships among the properties are taken into account based on the underlying physics of porous media and the thermodynamical considerations of fluids. Embodiments herein utilize the following process considerations:

Parametization related to geometry, intrinsic material properties, rock surface properties, and those related to fluid movement, and additional properties that affect responses Characterization of fluids, and the specification of displacement processes, along with estimation of transport properties for the given geometric and material description Computation of reservoir state at time of data acquisition, the state being given by phase saturations, component concentrations within phases, pressure and temperature (Components are defined in the sense described in standard text books of transport phenomena, see e.g. Bird et al., *Transport Phenomena*, John Wiley (2002). Thus, the physics of displacement as dictated by multicomponent and multiphase flow is included.)

Automatic inclusion of thermodynamical considerations for multicomponent phase properties Computation of effective grid block stimuli related property for a state of the reservoir Computation of measurement tool responses for the state of the system (In particular, electrode array, capture cross-section, hydrogen index, gravity response, acoustic and seismic propagation, pressure, layer flow-rates, and temperature are covered. If fluid compositional data is available then the respective mole or mass fractions within the phases saturating the rock may be included. Alternatively, responses to such compositional variations may be considered. Lithology of the rock and the material properties of the rock are included in the calculations because some of the response are affected by these. Examples of this would be density and clay enhanced conductivity.)

Assimilation of the computed response and the statistics, along with expected errors on the fluid transport computations, and the computed stimuli responses The details of the wellbore and the completion intervals along with the detailed specification of the tool to account for the influence of the fluid surrounding the tool Fluid mechanics of the wellbore to correctly treat "end effects" that affect reservoir flow behavior Surface gravity and gradiometry measurements In one embodiment, an approach is tailored to apply to rocks with unimodal pore distributions (excluding clay). In this approach, the first step is to identify the reservoir geometry from available seismic data. This is not limited to a parallel bedding model. Simplicity dictates that when data from three wells are available, devoid of seismic or structural information, the bedding will be planar, although not necessarily parallel. However, if dip information is available at the wellbore, a Petrel™ (a trademark of Schlumberger and commercially available from Schlumberger Technology Corporation of Sugar Land, Tex.) based interpolated surface may be constructed.

In one embodiment, data from one or more sources are used to construct a reservoir model having layers (strata). Values for a plurality of fundamental parameters of a predetermined set of fundamental parameters are assigned. Using scaling techniques, and multiphase multicomponent equations, solutions are obtained for pressure, saturation, temperature, and composition of the formation. From the pressure, saturation, temperature and composition, physical response-relevant properties such as electrically-based properties (e.g., conductivity), density-based properties, acoustically-based properties (e.g., p-wave velocity), and nuclear-based properties (e.g., capture cross-section) are computed. The calculated properties are provided to a tool-response model. Upon running a plurality of tests on/in the formation and providing the measurements to the tool-response model, values for the properties resulting from the measurements are obtained. The values obtained from the tests are compared to the values computed from the assigned values, and a multidimensional least-error search is used to update the (assigned) values for the fundamental parameters until a minimum or acceptable error is reached.

DETAILED DESCRIPTION

Figure 1:
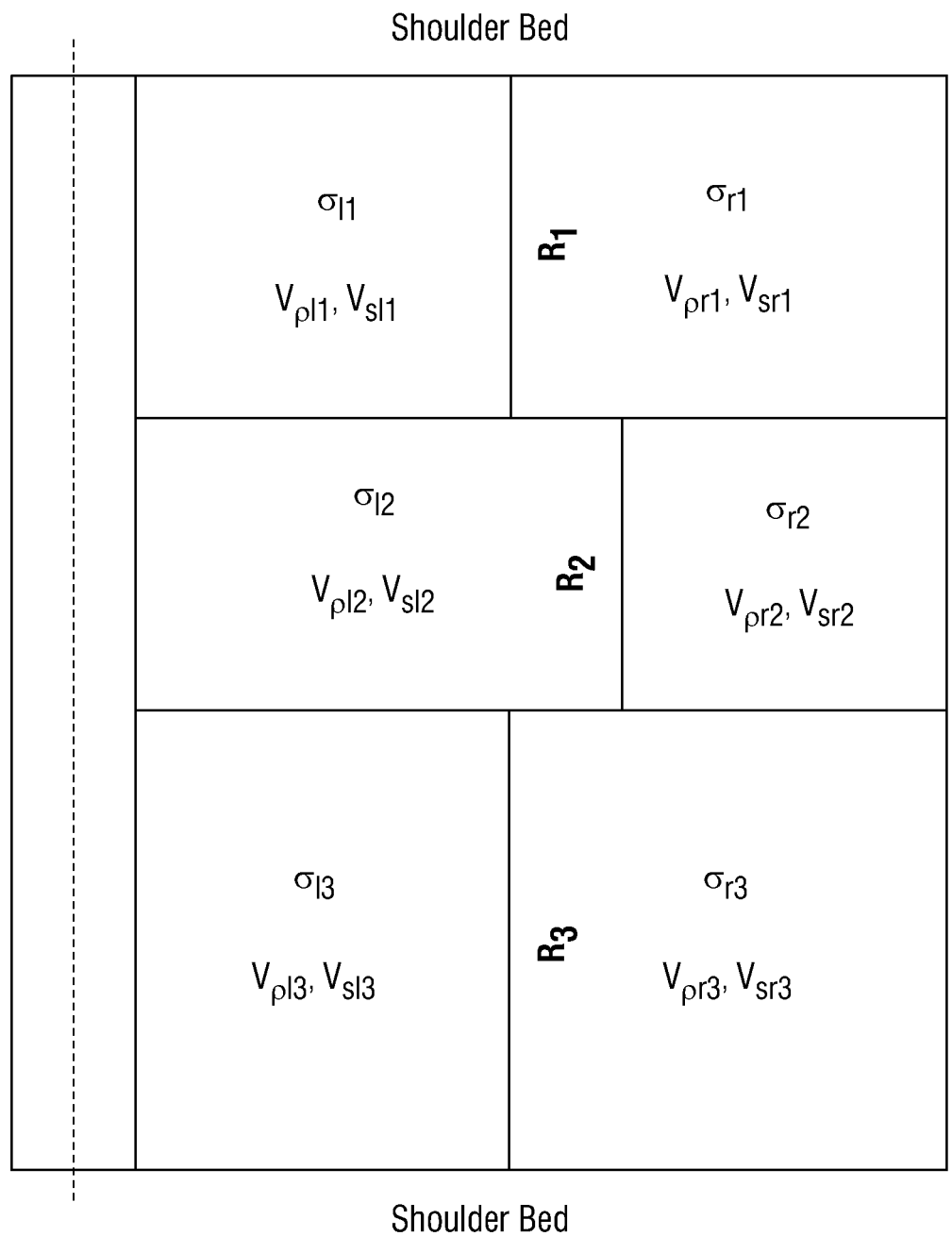
FIG. 1 illustrates a common geometry is used for inverting conductivities $\sigma_l$ and $\sigma_r$ as well as acoustic velocities $V_{pl}$, $V_{pr}$, $V_{sl}$ and $V_{sr}$.

Before turning to embodiments, additional background is instructive. Expanding on the prior art, a geometric model could be assumed for each of a plurality of response inversions. The geometric description may not be the same for each of the inversions, although retaining the same geometry across multiple inversions will (i) force models to be structurally consistent and (ii) reduce the number of parameters. A simple example of such an approach would be where two data sets are used to infer the position of a water-front. Thus, a layered medium is illustrated in FIG. 1. A radial position $R_i$ in each layer i signifies the water-front. For resistivity inversion, a conductivity value is assigned to the left and right of the front, these being $\sigma_{li}$ and $\sigma_{ri}$. The purpose of the resistivity experiment would be to inject current through an array of electrodes, and measure voltage responses in the electrodes. Alternatively, an intra-well (as in induction logging) or inter-well inductive measurements may be performed. Regardless, the purpose would be to use a multitude of single or cross-well measurements to obtain $\sigma_{li}$, $\sigma_{ri}$, and $R_i$ for each of the time snap-shots at which the data are acquired. These inverted quantities are all functions of time. When inter-well acoustic data are combined, each of these zones could be ascribed a $V_{pli}$, $V_{sli}$, $V_{pri}$, and $V_{sri}$, the compressional and shear velocities for the respective left and right zones of the $i^{th}$ layer. For consistency, it is preferable to keep $R_i$ the same between the two sets of inversions. Then, a joint geometric inversion is possible. The physics of such an inversion however, is disjointed. Each set of measurements contributes to inversion of a petrophysical property relevant to that response, but many or all of them contribute to the geometrical parameters. Thus, in this simple geometry, with 2N distinct zones for which the strata boundaries between the zones are assumed known, for M responses each associated with $n_i$ distinct petrophysical properties (for example acoustic response may comprise compressional and shear, and pressure may include porosity and permeability), the number of parameters is $$N_p = \Sigma_{i=1}^{M} 2Nn_i + N. \quad (1)$$

If the strata boundaries are added, there are additional N+1 (including top and bottom) zones added to $N_p$. Then, $$N_p = 2N + 1 + \Sigma_{i=1}^{M} 2Nn_i \qquad (2)$$

Here, it is assumed that the impermeable layers separating the permeable zones are counted as a part of N layers. It may be desirable to make $R_t=0$ in each of these impermeable layers, but for the present they are assumed to be unknowns. The conclusions are unaffected by this consideration. Thus, non-independent geometric constraints has the benefit of reducing the number of parameters by (M−1)(2N+1).

Using the above as an example, some problems become apparent. There is no guarantee that the parameters related to each stimulus are consistent. An extreme example of this would be if porosity is inverted from one set of measurements and conductivity from another, and the two are incompatible with each other. The second problem is the number of parameters that must be considered. Each type of data will add at least 2N parameters for this simple geometry. The third problem is more serious. The geometry considered, where each layer has two zones, was motivated by the need to represent a water flood injection. The construction was based on a tacit assumption that within each layer oil displacement may be given by a step saturation profile. However, this is known not to be true for all stimuli. Use of an incorrect geometric representation ultimately gives rise to inverted parameters that will be either non-physical or inconsistent with the others.

Figure 2:
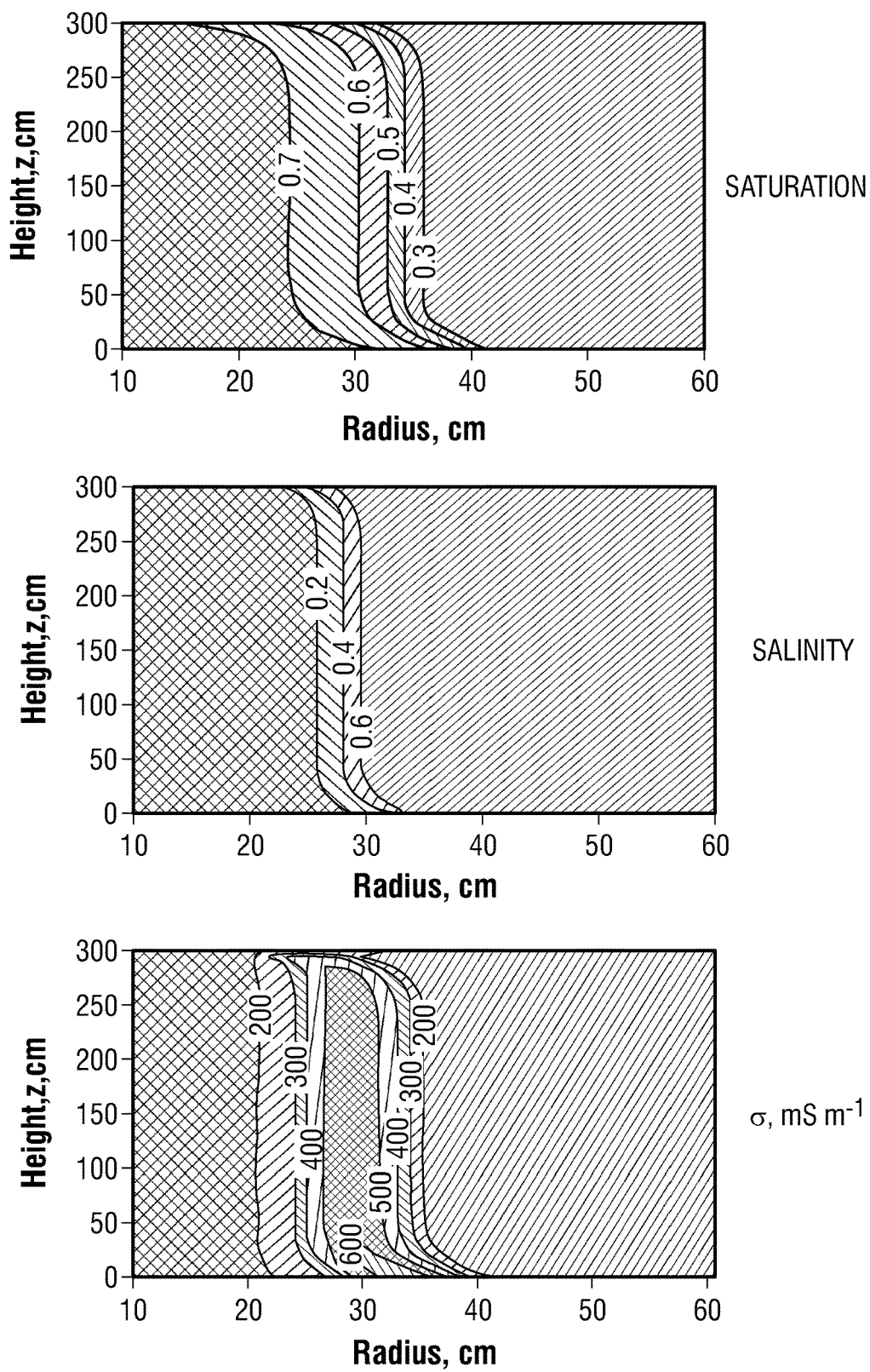
FIG. 2 is a series of contours with a first (top) panel providing a set of saturation contours, a second (middle) panel providing normalized salinity (fresh water is zero, saturated water is unity) and a third (bottom) panel providing conductivity contours.

To illustrate that geometrical representations are not universal across various responses and property distributions, the result of filtrate invasion as a result of drilling is shown in FIG. 2. FIG. 2 is a series of contours with a first (top) panel providing a set of saturation contours, a second (middle) panel providing normalized salinity (fresh water is zero, saturated water is unity) and a third (bottom) panel providing conductivity contours. The height z is measured pointing up from the bottom of the bed. The effects simulated include a mud-cake controlled flux into the formation, viscous pressure drop, capillary pressure and gravity contributions to flow. Salt transport is also taken into account. What is striking about the graphs in FIG. 2 is that filtrate invasion appears as a step profile both for saturation (top) and salinity (middle), save the gravity induced effects at the top and the bottom of the reservoir layer. But the conductivity contour map (bottom) shows that the profile is geometrically dissimilar to either and that profiles are largely annular. Geometrical similarity among a multitude of responses would certainly have failed for such a simple example.

The hereinafter-described embodiments overcome these issues.

The macroscopic element size is one over which continuum properties are unambiguously determinable within acceptable levels of fluctuation. This may be termed as representative elementary volume (Bear, J. *Dynamics of Fluids in Porous Media*, Elsevier (1972)). Underlying the macroscopic behavior, it can be assumed that a pore network consisting of the voids would be reasonably well-described by nodes and edges (see e.g., Mohanty, K. K. *Fluids in Porous Media: Two-Phase Distribution and Flow*, PhD thesis, Minneapolis (1981)). Oren, P. E. and Bakke S., *Process Based Reconstruction of Sandstones and Prediction of Transport Properties*, Transport in Porous Media 46 (2), 311-343 (2002)) have demonstrated the viability of an approach for reconstructing the rock geometry while preserving characteristic pore dimensions and network topology.

For a uniform medium, each pore has $z_c$ branches that form the throats. In the simplest of cases, pore throats are correlated to pores at each junction, and this ratio of pore body to throat sizes is labeled as $\alpha$. Mohanty's (1981) procedure may be used for defining this pore size ratio. This is based on passing the largest possible sphere through the complex geometry of a pore and computing the maxium to minimum ratio between nodes.

Furthermore, the geometry may be simplified so that each pore is connected by cylindrical throats, and the pore throats from adjacent pores are connected in a zone of nearly zero length. The volume of each pore will include the throats surrounding the pore. Under normal conditions, the throats are expected to be short and substantially smaller in diameter than a pore size, and so its volume may be small. With a one to one correlation between pore and throat sizes, and with the pore throat volume neglected, the volume of each pore is characterized by the pore size, $r_p$, and the exponent relating volume of a pore to a characteristic length scale, $\upsilon$. But under geometric scaling of all pores, for a fixed $\alpha$, the volume of the pore and throat assembly scales is $l^\upsilon$, where l is a characteristic length of the pore and is related to $r_p$, $\alpha$, and the longitudinal extent of the throats in relation to $r_t$, and the shape of the pore. If throat volumes are neglected as stated previously, only the dependency on $r_p$ is relevant.

If l is chosen to be the volume to surface ratio, then for spherical pores where throat contributions are neglected, $l=(1/3)r_p$, $\upsilon=3$. Thus, the fundamental parameters related to pore size and shape characterization would be l, $\upsilon$, $\alpha$, $z_c$. The entire pore space is described by $g_l(l)$, the pore volume density function. The relationship between pore volume density and number density functions are elaborated by U.S. Pat. No. 7,221,158 to Ramakrishnan which is hereby incorporated by reference herein in its entirety. In addition, the ratio of the void volume to total volume is the porosity $\phi$. Ball and stick models do not compute $\phi$ correctly from regular lattices, and in the absence of allowance of parameterized distortions, in one embodiment porosity is kept as an independent parameter. It is therefore a fundamental presumption that for natural rocks it is not necessary to compute $\phi$ from the rest of the pore space specification. A characterization of a macroscopic volume of element of rock is then given by the following:

Porosity, $\phi$. The most fundamental property of a porous medium, defined as the ratio of void volume to total volume.

Pore size distribution, $g_l(l)$. The pore volume density function where l is the volume to surface ratio. In regular geometries that are invariant with l, the distribution may be alternatively expressed as $g_p(r_p)$, the pore body volume density function or $g_t(r_t)$ the pore throat volume density function. In one embodiment it is assumed that there is a one to one relationship between pore and throat sizes.

Pore size to throat ratio, $\alpha$. This is the pore body to throat size ratio. For irregular geomteries this number is based on the ratio of the capillary pressure required for a nonwetting fluid to penetrate a throat to the capillary pressure for a wetting fluid to replace a nonwetting fluid in the pore.

Volume exponent, $\upsilon$. The exponent that relates the volume of a pore to l. Therefore $V(l) \propto l^\upsilon$ or $V(l)=A_\upsilon l^\upsilon$ where $A_\upsilon$ is a constant. When related to the NMR $T_2$, the distribution may be equally well represented by $g_{T_2}(T_2)$, with the surface relaxivity, $\rho_r$ introduced as an additional parameter. $T_2$ is the transverse relaxation time. Alternatively, this can be written in terms of intrinsic transverse relation time $g_{T_{2i}}(T_{2i})$. In principle, this may be related through empiricism to mineral content.

Coordination number, $z_c$. This is the number of branches of the pore network from a node. A simple cubic lattice has $z_c=6$, whereas a body-centered cubic lattice has $z_c=8$.

Mineral composition, M. This is a vector of mineral composition of the rock matrix, elements of the vector being mass fractions of each mineral constituent $M_i$. Simple examples inlcude fractions of quartz, limestone, dolomite, illite, smectite, kaolinite, and chlorite. It is noted that the matrix density is calculable from the mineral composition, and is of relevance for acoustics and gravity responses. The mineral composition also affects the elastic moduli. It changes the baseline for nuclear measurements, and clay contributions enhance electrical conduction.

As per the principles outlined in pore network modeling or percolation theory, for a given $g_l(l)$ and a network, it should be possible to estimate $S_{wr}$ (residual water saturation) and $S_{nrm}$ the maximum residual nonwetting phase saturation (Ramakrishnan, T. S., and Wasan, D. T., *Two-Phase Distribution in Porous Media: An Application of Percolation Theory*. Int. J. Multiphase Flow 12(3), 357-388 (1986). In other words, for a given $g_l(l)$, there is a paired relationship between $(S_{wr}, S_{nrm})$ and $(\upsilon, z)$. Thus, according to one aspect, it becomes inconsequential as to whether one pair or the other is used to represent the fundamental parameterization. It is noted that the saturation values are more readily measured.

Similarly, there are expected to be a host of derivable parameters from the fundamental set. For some, these may be substituted for the fundamental set provided there is an expected N↔N relationship. A good example is the replacement of $S_{nrm}$) for $(\upsilon, z)$ (for a given $g_l(l)$) as discussed above. A listing of derivable parameters includes:

Permeability, k. This depends on characteristic pore size and tortuosity (characterized by coordination number $z_c$) to leading order, and to a lesser extent on the pore size distribution. For a one to one relationship between throat and pore sizes, $\upsilon$ becomes secondary. This is seen more clearly in the mathematical expressions given hereinafter. When expressed in terms of characteristic pore size $r_p$ as opposed to $r_t$, $\alpha$ affects permeability. Permeability is locally isotropic, and the manifestation of anisotropy is due to heterogeneity at scales larger than that needed to define macroscopic properties.

Entry capillary pressure, $p_b$. This is the capillary pressure required for the onset of a sample spanning pathway for the nonwetting phase. The entry capillary pressure is related to the permeability k via the Leverett relationship or by other methods described in more detail hereinafter. The Leverett relationship introduces $J_b$ (a dimensionless form of $p_b$) whose value is usually between 0.1 and 0.3. $J_b$ may relate to $\tilde{C}$ described hereinafter.

Residual water, $S_{wr}$. This is covered by the discussion above on the relationship between pairs $(S_{wr}, S_{nrm})$ for $(\upsilon, z)$ for a fixed $g_l(l)$.

Maximum residual oil saturation, $S_{nrm}$. A quantity that is also derivable from parameterization $(\upsilon, z)$ once $g_l(l)$ is specified.

Cementation exponent, m. This is a measure of how the tortuous pore structure results in hindered conductivity. To leading order, the microscopic conductivity problem is independent of pore size, and to a large degree independent of $\upsilon$ and $\alpha$. Then, from dimensional considerations, only the coordination number influences m strongly. Additional enhanced conductivity may occur due to the presence of charged surfaces.

Saturation exponent, n. The exponent of saturation in the Archie relationship. For simplicity, often n is made equal to m.

Corey exponent, $\lambda_{BC}$, The Corey exponent for capillary pressure is derived by computing capillary pressure curves from first principles, i.e. from $g_l(l)$ and $z_c$. The definition of the Corey exponent is derived from Brooks, R. H. and Corey, A. T., *Properties of Porous Media Affecting Fluid Flow*. J. Irrig. Drainage Div., 92(IR2), 61-68 (1966).

Cation exchange capacity, $Q_v$. The adsorption capacity for cations is also a measure of the surface charge density $\hat{Q}_v$. The capacity is usually in equivalents per unit volume. In one embodiment, it is assumed that $\hat{Q}_v$ is derivable from the mineral vector M. In the absence of other information it can be assumed that $\hat{Q}_v$ is determinable from $Q_v$. Associated with $Q_v$ is a factor b that describes the enhanced conductivity. In one embodiment it is assumed that it is possible to describe b in terms of other parameters or variables, although this assumption may be relaxed.

Surface relaxivity, $\rho_r$. In one embodiment it is assumed that the empirical relationship between surface relaxivity and mineralogy is a conjecture for which sufficient quantitatively usable experimental data is unavailable. In one embodiment rough estimates are considered known, with sandstones expected to have values of 3-10 μm s$^{-1}$, and carbonates expected to have values a factor two to three lower than sandstones.

There are also a few derivable functions including:

Capillary pressure. Estimating the value of $(\upsilon, z)$ from residual saturations and $g_l(l)$, it is possible to compute capillary pressure curves. Then the Corey exponent $\lambda_{BC}$ may be calculated. The path dependency of these curves is described hereinafter.

Relative permeabilities. Knowing the residual saturations and $\lambda_{BC}$, all of the hysteresis loops of the relative permeability curves may be calculated.

In one aspect, two fundamental parameterizations are presented. When the density function $g_l(l)$ is available, a first fundamental set may be constructed. In one fundamental parameterization embodiment it is assumed that a correlation for $\rho_r$ in terms of M is unavailable. Often acoustic velocities are affected by the extent of cementation (which are expected to relate to m) and the shape of the pores (pore aspect ratio) denoted by η, reflecting the deviation from a perfect sphere. Therefore, in one fundamental parameterization embodiment the set of unknown parameters will be (φ, $\upsilon$↔η, z, $g_l(l)$, α, $\rho_r$, M). Parameters m, n, $p_b$, or $J_b$, $Q_v$, and k are derived. As indicated above, in all likelihood, η is related to $\upsilon$, because $\upsilon$ is related to deviation from a spherical shape.

In contrast, in another fundamental parameterization embodiment when $g_l(l)$ is unavailable or when NMR is thought to be unreliable for providing the distribution, the fundamental parameter set is (φ, $S_{wr}$, $S_{nrm}$, $\lambda_{BC}$, α, k, M, m=n, $Q_v$, η) Comparing the two embodiments, it appears that two extra parameters result in the latter embodiment. However, it should be appreciated that parameter $g_l(l)$ in the first set is a distribution and therefore constitutes a plurality of parameters and not just one parameter. In one aspect, it may be considered that using $g_l(l)$ is advantageous in that it is more general, whereas the use of $\lambda_{BC}$ constrains the applicability to a subset of rocks, usually unimodal. On the other hand, the ten-parameter representation of the second fundamental parameterization embodiment constitutes parameters that are macroscopically measurable, except for $\eta$ that often will be inferred from acoustic data. It will be appreciated that most unimodal rock systems appear to follow a universal behavior and $\eta$ is needed only when there is a deviation from the universal behavior.

The sets of fundamental parameters of two embodiments are summarized in Table 1. The left column applies when a volume density function is available. The pair $(\upsilon, z)$ is a part of the fundamental set. In contrast, the second column is based on a set that relies upon using $S_{wr}$, $S_{nrm}$, and $\lambda_{BC}$.

TABLE 1

Fundamental parameter sets with and without pore size distribution (PSD)

| Set 1 with PSD | Set 2 without PSD |
|---|---|
| $\phi$, porosity | $\phi$ |
| $\nu$, size exponent | $S_{wr}$, residual water |
| $z_c$, coordination no. | $S_{nrm}$, maximum residual oil saturation |
| $g_{T2i}(T_{2i}) \equiv g_{T2i}(T_{2i})$, gl(l), $g_p(r_p)$, $g_t(r_t)$ | $\lambda_{BC}$ |
| $\alpha$, pore to throat size raio | $\alpha$ |
| | $J_b$ and k |
| $\rho_r$, NMR relaxivity, depends on M | |
| M, the mineral array | M |
| | m, cementation exponent |
| | n, saturation exponent |
| | $\eta$, pore aspect ratio |
| $Q_\nu$, cation exchange capacity | $Q_\nu$ |

A note with regard to the connate water saturation $S_{wc}$ is worth mentioning. Although $S_{wc}$ is not an intrinsic parameter of the rock, the connate wetting phase saturation describes the initial state before any wetting phase intrusion or imbibition occurs. The hysteresis paths depend upon this value. In one embodiment, this is not an adjustable parameter in the inversion because once the free water level is specified, along with the other parameters, $S_{wc}$ is determined fully from the local capillary pressure curve.

It should also be noted that in one embodiment the mineral vector M is not regarded to be derivable from $g_l(l)$ since not all mineral constituents are computable from $g_l(l)$, and there is no fundamental reason to substantiate its derivability. In particular, two different mineral assemblies may have the same $g_l(l)$. But in one embodiment, $\rho_r$ may be regarded to be a function of M, provided the composition does not vary from the surface of the grain to the bulk.

For purposes of description only, the second column parameter listing of Table 1 will be used with further modifications as shall be described hereinafter. According to one aspect, the second column parameter listing may be chosen because in practice, $g_l(l)$ (which is in the first column parameter listing but not the second) is not necessarily measured robustly. An NMR measurement is highly subject to noise, and regularization induces a wide spread in the computed $g_l(l)$. In addition, the presence of clays give rise to a anomalous bimodality and the assumption of a single u and $z_c$ fails. Furthermore, there may not be enough empirical data to confirm the predictions of the model. These problems do not exist in the slightly more empirical parameterization in the second column of Table 1, but restricted to rocks that obey the Brooks and Corey (1966) capillary pressure curve. The parameterization of the second column also circumvents the need to keep track of residual water that is related to clay retainment as opposed to network trapping and pendular ring associated wetting aqueous phase. The porosity $\phi$ is then the total porosity, and the $S_{wr}$ value includes that part of the aqueous phase retained between clay platelets. Therefore, $S_{wr}$ will change with salinity and so will porosity. For simplicity, it can be assumed that the salinity is always sufficiently high that this change is inconsequential.

It should be appreciated that many of the parameters of the second parameterization set have a narrow range, as listed in Table 2.

TABLE 2

Parameter lower and upper bounds

| Set 2 | Range |
|---|---|
| $\phi$, porosity | (0.02-0.35) |
| $S_{wr}$, residual water saturation | (0.05-0.4) |
| $S_{nrm}$, maximum residual oil saturation | (0.05-0.5) |
| $\lambda_{BC}$ | (1.-4.) |
| $\alpha$, pore to throat size ratio | (2.-5) |
| $J_b$ | (0.05-0.4) |
| m, cementation exponent | (1.5-3.) |
| n, saturation exponent | (1.5-3.) |
| $\eta$, aspect ratio | (5.-10.) |

Of the chosen fundamental parameters $\phi$, $S_{wr}$, $S_{nrm}$, $\lambda_{BC}$, $\alpha$, k, M, m, n, $Q_\nu$, and $\eta$, parameter $\lambda_{BC}$ is often difficult to converge upon. Variability in the fractional flow curve with respect to $\lambda_{BC}$ is adequately represented by adjusting $S_{wr}$ while keeping $\lambda_{BC}$=2, i.e., $S_{wr}$ and $\lambda_{BC}$ are cross-correlated. Also, in one embodiment m is allowed to be independent, because the relationship among m, $S_{wr}$, $S_{nrm}$, $g_l(l)$, and $\lambda_{BC}$ is generally unavailable.

The nondimensional parameters in the listing are $Q_\nu$ and k. $Q_\nu$ may be obtained from vector M or may be given independently, e.g. from spontaneous potential logs. The latter is a reasonable estimate of surface charge density $\hat{Q}_\nu$, (charge per unit area) in thick beds, and it is this surface charge that is relevant for relating conductivity to salt concentration. Permeability, the remaining parameter, is not easily determined and the range for it is rather broad. The shape of the pores and its effect on acoustic velocities through $\eta$ is also not known a priori. To start with, it may be convenient to have core data in surrounding wells to calibrate this value. Another alternative is to estimate $\eta$ that best fits acoustic data, provided all other variables are known with a high degree of confidence. The inter-granular curve discussed hereinafter may then be calibrated, although in one aspect, this may only be possible only in a zone where saturation is unity.

It should be noted that many quantities that would appear in a parameter listing in tomographic inversions are not unknowns here. As an example, voxel-based density values for inverting gravity data do not appear in this list, because the field variables such as saturations and fluid and matrix densities are computable by solving the displacement equations along with the relevant thermodynamic relationships. These displacement and governing equations are given hereinafter.

Referring now to single phase flow, in the absence of a strong electric field inducing flow, the superficial velocity vector of a fluid phase with pressure p is $$\upsilon = -\frac{k}{\mu}(\nabla p - pg). \qquad (3)$$

where g is the gravitational vector, $\rho$ is the local fluid density, and $\mu$ is the shear coefficient of fluid viscosity. In one embodiment it may be assumed that off-diagonal terms where fluid flow may be induced by temperature and electrical potential are negligible. For any phase of interest, the thermodynamic equation of state allows the local fluid density to be expressed as $$\rho = \hat{\rho}(p, T, w_i) \quad (4)$$

Here $w_i$ represents the composition of the fluid phases in terms of mass fractions so that $\Sigma_i\, w_i = 1$, and T is the temperature. A transport coefficient model allows the prediction of viscosity from $$\mu = \hat{\mu}(p, T, w_i). \quad (5)$$

In the absence of chemical reactions, the solutions to the governing continuity equations $$\partial[\phi\rho]/\partial t + \nabla \cdot (\rho v) = 0, \quad (6)$$

and $$\partial[\phi w_i \rho]/\partial t + \nabla \cdot (\rho w_i v_i) = 0, \quad (7)$$

in conjunction with Darcy's law are p, T, and $w_i$. The system needs to be solved simultaneously to obtain these as functions of (x, t). If there are N components (e.g., for nonreacting systems, but in an equilibrated reacting system, these will be for N independent components), the independent continuity equations with Darcy's law add up to N+3, with the unknowns $w_i$, p, and T numbering N+1. With the velocity vector v, the number of unknowns become N+4. The additional equation involves energy balance. Note that to get $v_i$, in terms of v one needs to know the description for diffusion (or equivalently) coefficients with respect to (p, T, $w_i$). Furthermore, the intrinsic diffusion coefficient, denoted $D_i$, should be modified for motion within a porous medium. $D_i$ is the diffusion coefficient of component i in a bulk mixture at a specified composition. The discretized equations are solved simultaneously. The equations for these are $$\rho w_i (v_i - v) = -\rho D_{ei} \nabla w_i, \quad (8)$$

with $$D_{ei} = \frac{D_i}{F}, \quad (9)$$

where F is the formation factor. Based on an Archie model for electrical conduction and its synonymous relationship with diffusion, $$F = \frac{1}{\phi^m}. \quad (10)$$

It should be appreciated that in equations (3)-(10), $\phi$, m, and k are the only parameters that appear from Table 1. The above correction of equation (9) using formation factor applies to nonionic species. Enhanced conduction due to clay modifies effective diffusivity (see e.g. Revil et al., *Influence of the Electrical Diffuse Layer and Microgeometry on the Effective Ionic Diffusion Coefficient in Porous Media*, Geophysical Research letters 23(15), 1989-1992 (1996)) from the one above.

Referring now to multiphase computations, in two-phase flow, the phase pressures are distinct. Without loss of generality they may be labeled $p_n$ and $p_w$, with n denoting the nonwetting phase. The difference between the two is the capillary pressure and for closure, the principle of local capillary equilibrium may be used, i.e., the saturation in a Leverett-scale macro-element is determined by its capillary pressure, $p_c$ according to what its values are in the absence of flow. In two-phase flow, the elementary volume size is considerably larger than in single phase flow for this reason, and is based on a length scale where size related fluctuations diminish for relating $p_n - p_w$ to $S_w$. Furthermore, the gradients in saturation must be small enough that over this length scale $\Delta S_w$ must be small compared to unity. Thus, the Darcy scale is distinguished from the Leverett scale. The relation between $p_c$ and $S_w$ is, in general, path dependent, but for a given direction of change, and for a specified initial condition, it becomes an invertible function of saturation in two-phase flow. The path dependent capillary pressures are called the scanning curves.

To specify quantitatively the scanning curves with utmost accuracy is a difficult task. A number of models exist and are used as approximations. One such model is due to Killough, J. E., *Reservoir Simulation with History-Dependent Saturation Functions*, Soc. Pet. Eng. J. 16, 37-48 (1976). One embodiment is that of Ramakrishnan, T. S. and Wilkinson, D., *Formation Producibility and Fractional Flow Curves from Radial Resistivity Variation Caused by Drilling Fluid Invasion*, Phys. Fluids 9(4), 833-844 (1997) as further elaborated by Altundas et al., *Retardation of $CO_2$ Due to Capillary Pressure Hysteresis: a New $CO_2$ Trapping Mechanism*, Soc. Pet. Eng. J. 16, 784-794 (2011). The model is successful for a nonwetting phase intrusion followed by extrusion and then an intrusion. It involves first a parameter $p_b$, which is described in terms of $\phi$, k, $J_b$, and interfacial tension, a fluid-fluid property. Given (k, $\phi$) pairs and the interfacial tension $\gamma$ between the wetting and nonwetting phases, $$p_b = \gamma J_b \cos\theta \sqrt{\frac{\phi}{k}}, \quad (11)$$

where $J_b$ has a fairly narrow range of 0.1-0.3, and $\theta$ is the advancing contact angle for phase n. One aspect of this methodology is that fairly tight restrictions that interrelate the constituents are possible. Furthermore, with sparse data, in the absence of any further information, a judicious reduction in the number of parameters is possible. For example, one may circumvent the use of $J_b$ as follows. First, k is related to $r_{pc}$, the percolating pore radius, or $r_{tc}$, the percolating throat radius (Johnson et al., *New Pore-Size Parameter Characterizing Transport in Porous Media.*, Phys. Rev. Lett. 57(20), 2564-2567 (1986); MacMullin, R. B. and Muccini, G. A., *Characteristics of Porous Beds and Structures*. AIChEJ 2(3), 393-403 (1956); and U.S. Pat. No. 6,088,656 to Ramakrishnan et al.) by $$k = \frac{1}{\tilde{C} F} r_{tc}^2 \approx \frac{1}{8F} r_{tc}^2 = \frac{1}{8a^2 F} r_{pc}^2 = \frac{\phi^m}{8} r_{tc}^2, \quad (12)$$

where $\tilde{C}$ is a proportionality constant. Replacing $r_{tc}$ with $(2\gamma \cos\theta)/p_b$ obtains $$k = \frac{\phi^m \gamma^2 \cos^2\theta}{2 p_b^2}, \quad (13)$$

or

-continued $$p_b = \gamma\cos\theta\sqrt{\frac{\phi^m}{2k}}. \quad (14)$$

The factor $\tilde{C}=8$ in Equation 12 is approximate, and a three-fold variation is not uncommon. As an example, an extended range for $\tilde{C}$ may be from 4 to 16. With the factor $\tilde{C}$ introduced, equation (14) becomes $$p_b = \gamma\cos\theta\sqrt{\frac{4\phi^m}{\tilde{c}k}}, \quad (15)$$

as a more general expression in which e may be inverted for. Equation (15) may be considered more accurate than the one based on the Leverett J function as it captures the tortuous pathways through the cementation exponent m and as a consequence provides a tighter bound for the inverted parametric quantity. The modification of the parameter set with respect to this approach is summarized in Table 3. In Table 3, two different embodiments are provided: one with pore size distribution (PSD), and one without.

According to one aspect, the range for the parameters of Table 3 without pore size distribution is given in Table 4.

TABLE 3

Modified parameter sets with and without pore size distribution (PSD)

| Set 1 with PSD | Set 2 without PSD |
|---|---|
| $\phi$, porosity | $\phi$ |
| v, size exponent | $S_{wr}$, residual water |
| $z_c$, coordination no. | $S_{nrm}$, maximum residual oil saturation |
| $g_{T_{2i}}(T_{2i}) = g_i(l), g_p(r_p), g_t(r_t)$ | $\lambda_{BC}$ |
| $\alpha$, pore to throat size ratio | $\alpha$ |
|  | $\tilde{C}$ and k |
| $\rho_r$, NMR relaxivity, depends on M | |
| M, the mineral array | M |
|  | m, cementation exponent |
|  | n, saturation exponent |
| $Q_v$, cation exchange capacity | $Q_v$ |
| $\eta$, pore aspect ratio, | $\eta$ |

TABLE 4

Parameter lower and upper bounds with $\tilde{C}$ replacing $J_h$

| Set 2 | Range |
|---|---|
| $\phi$, porosity | (0.02-0.35) |
| $S_{wr}$, residual water saturation | (0.05-0.40) |
| $S_{nrm}$, maximum residual oil saturation | (0.05-0.50) |
| $\lambda_{BC}$ | (1.-4.) |
| $\alpha$, pore to throat size ratio | (2.-5.) |
| $\tilde{C}$ | (4.-16.) |
| m, cementation exponent | (1.5-3.) |
| n, saturation exponent | (1.5-3.) |

To characterize multiphase flow, additional saturation dependent properties are needed. These are the relative permeabilities $k_{rw}$ and $k_{rn}$, which depend on the saturation and the path (as does the capillary pressure). The previously published models require no additional parameters than what has been discussed, and according to one aspect are ideal for integrated inversion.

A summary of the drainage and the imbibition capillary pressure curves is as follows. If $p_{cd}$ is used to denote the primary drainage capillary pressure curve, per the Brooks-Corey relationship $$S_w = \begin{cases} S_{wr} + (1-S_{wr})\left(\frac{p_b}{p_{cd}}\right)^{\lambda_{BC}} & \forall\, p_{cd} > p_b \\ 1 & \forall\, p_{cd} < p_b \end{cases} \quad (16)$$

The imbibition curves are also easily generated. The steps for these are as follows. Given the historically lowest saturation ($S_{wc}$) reached at the point of interest, the disconnected nonwetting phase saturation are computed. This disconnected saturation is calculated based on the work first proposed by Land, C. S., *Calculation of Imbibition Relative Permeability for Two and Three Phase Flow From Rock Properties*, Soc. Pet. Eng. J. 8, 149-156 (1968). The imbibition capillary pressure, $p_{ci}$, is then written following previously referenced Ramakrishnan and Wilkinson (1997) as further elaborated by previously referenced Altundas (2011) by $$S_w = (1-S_{wr})\left(\frac{p_b}{\alpha p_{ci}}\right)^{\lambda_{BC}} + S_{wr} - S_n^{dc}. \quad (17)$$

The disconnected nonwetting phase saturation, $S_n^{dc}$, depends on not only the local $S_w$ but also the lowest $S_w$ reached locally. This lowest point is kept track of through the variable $S_{wc}$. The imbibition capillary pressure is also applicable to secondary drainage, provided $\alpha$ is replaced with unity. Additionally, in Ramakrishnan, T. S. and Wasan, D. T., *Effect of Capillary Number on the Relative Permeability Function for Two-Phase Flow in Porous Media*. Powder Technol. 48, 99-124 (1986), relative permeability curves $k_{rw}$ and $k_{rn}$ for both the wetting and the nonwetting phases are given for arbitrary $\lambda_{BC}$ as a function of $S_w$ and $S_n^{dc}$, for a specific path.

Turning now to governing equations, the multiphase-multicomponent equations include first the extended Darcy equations $$v_w = -\frac{kk_{rw}}{\mu_w}(\nabla p_w - \rho_w g), \quad (18)$$

where $\mu_w = \hat{\mu}_w(p_w, T, w_{wi})$ and $\hat{\rho}_w = (p_w, T, w_{wi})$. The subscript w is used to denote properties within phase w. The formulation is similar to the single phase equations for density and viscosity, except that the property is computed at the phase pressure and compositions. A similar equation for the nonwetting phase is $$v_n = -\frac{kk_{rn}}{\mu_n}(\nabla p_n - \rho_n g), \quad (19)$$

with a corresponding functional dependence for density $\rho_n$ and viscosity $\mu_n$. The phase velocity Darcy equations are supplemented by continuity equations for the components within each phase. In one embodiment, it may be assumed that these are for N independent components in a reacting system. Thus, $$\frac{\partial}{\partial t}[\rho_w w_{wi}S_w + \rho_n w_{ni}(1-S_w)]\phi + \nabla \cdot [(v_{wi}\rho_w w_{wi} + v_{ni}\rho_n w_{ni})] = 0. \quad (20)$$

In the absence of diffusion, the vector $v_{wi}=v_w$. Otherwise, the two may be related through an effective diffusion coefficient for i in the mixture within the wetting phase at the composition of interest, $$\rho_w w_{wi}(v_{wi}-v_w)=-\rho_w D_{wei}\nabla w_{wi}, \quad (21)$$

and the nonwetting phase $$\rho_n w_{ni}(v_{in}-v_n)=-\rho_n D_{nei}\nabla w_{ni}, \quad (22)$$

with $$D_{wei}=D_{wi}/F_w, \quad (23)$$

where the effective diffusion coefficient is expressed in terms of the molecular diffusion coefficient. In a traditional Archie model (see, Archie, G. E., *The Electrical Resistivity Log as an Aid in Determining Some Reservoir Characteristics*, Trans. AIME 146, 54-62 (1942)), $$F_w = \frac{1}{\phi^m S_w^n}. \quad (24)$$

The nonwetting phase effective diffusion coefficient is $$D_{nei}=D_{ni}/F_n, \quad (25)$$

with $$F_n = \frac{1}{\phi^m (1-S_w-S_n^{dc})^n} \quad (26)$$

with a saturation exponent n remaining unchanged. The above representation takes into account molecular diffusion alone for dispersion. At higher velocities, with an increase in Reynolds number, dispersion becomes dominant. Although correlations are available for single phase dispersion, multiphase dispersion is largely a matter of computation and conjecture. Since numerical dispersion usually is quite overpowering in reservoir simulation and channeling is important, physical dispersion issues become inconsequential.

If the system is not isothermal, an additional energy equation is desirable. This will require a description of specific heats of the two phases as a function of $p_w$ or $p_n$, T, and $w_{wi}$ or $w_{ni}$.

The energy equation for flow in porous media usually neglects work done by expansion or compression. Consistent with Darcy's law, it is possible to derive a satisfactory equation, which for the purpose of simplicity, is written here without the capillary pressure work terms as $$\frac{\partial}{\partial t}\phi(\rho_w S_w h_w + \rho_n S_n h_n) + \frac{\partial}{\partial t}(1-\phi)\rho_s h_s + \nabla \cdot (\rho_w v_w h_w + \rho_n v_n h_n) = \quad (27)$$
$$\frac{v_n^2}{\lambda_w} + \frac{v_w^2}{\lambda_n} + \frac{D_t p}{Dt} + \nabla \cdot (k_{Te}\nabla T).$$

The subscripts s and n refer to the solid and the nonwetting phase. By definition $S_n=1-S_w$. The subscript t in the substantial time derivative denotes that it is with respect to an advective total velocity vector $v_n+v_w$. The enthalpy of the phases is h. The phase enthalies are given by the sum of partial mass enthalpy-mass fraction products. It can be tacitly assumed that the term $\nabla \cdot (\rho_w v_w h_w + \rho_n v_n h_n)$ uses mass average velocity. The effective thermal conductivity is $k_{Te}$. The thermal conductivity of the mixture is approximated by several effective medium models, including Maxwell-Garnett (Landauer, R., *Electrical Conductivity in Inhomogeneous Media*, Electrical Transport and Optical Properties of Inhomogeneous Media, pp. 2-43, American Institute of Physics (1978)). Since capillary pressure has been neglected here, the phase average pressure for p may be used. The enthalpies are known as a function of phase pressure and temperature from thermodynamics.

The above-specified equations are solvable provided the parameters of Table 1 or 3 are given for either the left or the right column. The equations are solved subject to boundary conditions. The outputs are $p_w$, $p_n$, T, $S_w$, $w_{wi}$ and $w_{ni}$ and will vary with x and t.

With reference now to electrical measurements, the results for $w_{wi}$, $p_w$, T enable the computation of the conductivity of the wetting phase. In accordance with Archie's relation, or modifications thereof, the effective conductivity of the rock is known. An example of one such modification is that of Waxman, M. H. and Smits, L. J. M, *Electrical Conductivities in Oil-Bearing Shaly Sands*, Soc. Pet. Eng. J 8, 107-122 (1968), followed by Waxman, M. H. and Thomas, E. C., *Electrical Conductivities in Shaly Sands-i. the Relation Between Hydrocarbon Saturation and Resistivity Index; ii. The Temperature Coefficient of Electrical Conductivity*, J. Pet. Technol. pp. 212-225 (1974). Yet another example of a modified conductivity equation is due to Clavier et al., *The Theoretical and Experimental Bases for the "Dual Water" Model for the Interpretation of Shaly Sands*, Soc. Pet. Eng. J. 24(2), 153-168 (1984). Numerous such modifications exist, none of which is universal. In one embodiment it is assumed that the equation for conductivity of a voxel may be obtained once the conductivity of the wetting (conducting) fluid is known from $w_{wi}$, $p_w$, and T. Thus, $$\sigma=\hat{\sigma}(\hat{\sigma}_w(p_w,T,w_{wi}),\phi,S_w;m,n,Q_v,b), \quad (28)$$

where b is a parameter associated with clay influence on conductivity and is correlated. Thus, $\sigma$ is known for every (x, t) once the parameters are fixed, and the field variables have been computed. Because of small deformation assumption, the dependence of this functionality on p and T has been ignored. Otherwise the dependence of $\phi$, m and n on the mean stress, the fluid pressures, the saturation with the history (the latter is expected to be a minor effect, since $p_c \ll p$ in practical cases) may be included. This should also be consistently enforced across all phenomena to the same order.

Electrical measurements may be broadly divided into two categories. One category involves tools that operates with current or voltage injection at low frequencies where the resistive nature of the formation dominates. Here every element of the formation behaves in accordance with Ohm's law. The second category involves tools that operate based on the induction currents. Here a coil induces a magnetic field, which in turn induces a current in the formation. The induced current is picked up in another coil, and the measurement is indicative of the conductivity of the formation. For purposes of brevity, an interpretation is presented herein based on the former set of tools, where the description is based on current conservation and Ohm's law. Equivalent methods are readily constructed for the latter set of tools by replacing the governing equations with Maxwell's equations which include Ampere's law, Biot-Savart principle and Faraday's law of induction and should be considered a part of this disclosure. These may be understood from the principles of induction logging set forth in Ellis, D. V. and Singer, J. M., *Well Logging for Earth Scientists*, Springer Verlag (2007).

The conservation of charge in the absence of charge accumulation or dissipation implies $$\nabla \cdot i = 0, \quad (29)$$

where the vector i is the charge flux or current per unit area. For the low frequency limit in resistive media $$i = -\sigma \nabla V, \quad (30)$$

where σ is a temporally and spatially varying conductivity, and is obtained from Eq. 28. Therefore, $$\nabla \cdot (\sigma \nabla V) = 0. \quad (31)$$

The sources and sinks are accommodated as boundary conditions. Alternatively, the sources and sinks may be imposed on the right hand side of equation (31). Equation (31) may be solved by any of the standard finite difference or finite volume or finite element methods for a given set of parameters listed in Table 3. The geometry of the tool specifies the sources and sinks for the current, and subject to these and the known conditions of conductivity within the well-bore and the surrounding layers, voltage measurements are obtained at the electrode locations. Conversely, voltages may be given at source locations for computing voltages at observation points. In one aspect, it should be appreciated that this approach is prone to error, because the contact resistance around the source electrode is generally an unknown.

The auxiliary information needed for these computations are shown in Table 5. Generally, $\sigma_b$ is obtained directly by having electrodes exposed to the borehole fluid with short spacing, similar to a fluid conductivity meter, and $\sigma_s$ is measured by having a measurement in the shoulder-bed. The latter is unaffected during much of the displacement processes, since these beds are either impermeable or have no perforations and are isolated otherwise.

TABLE 5

Additional specifications for electrical computations

| Parameters | Availability |
| --- | --- |
| $\sigma_s$, shoulder bed conductivity | Logs |
| $\sigma_b$, borehole conductivity | Sonde |
| Electrodes, size/shape | Tool architecture |
| Environment | Well completion |

Figure 3:
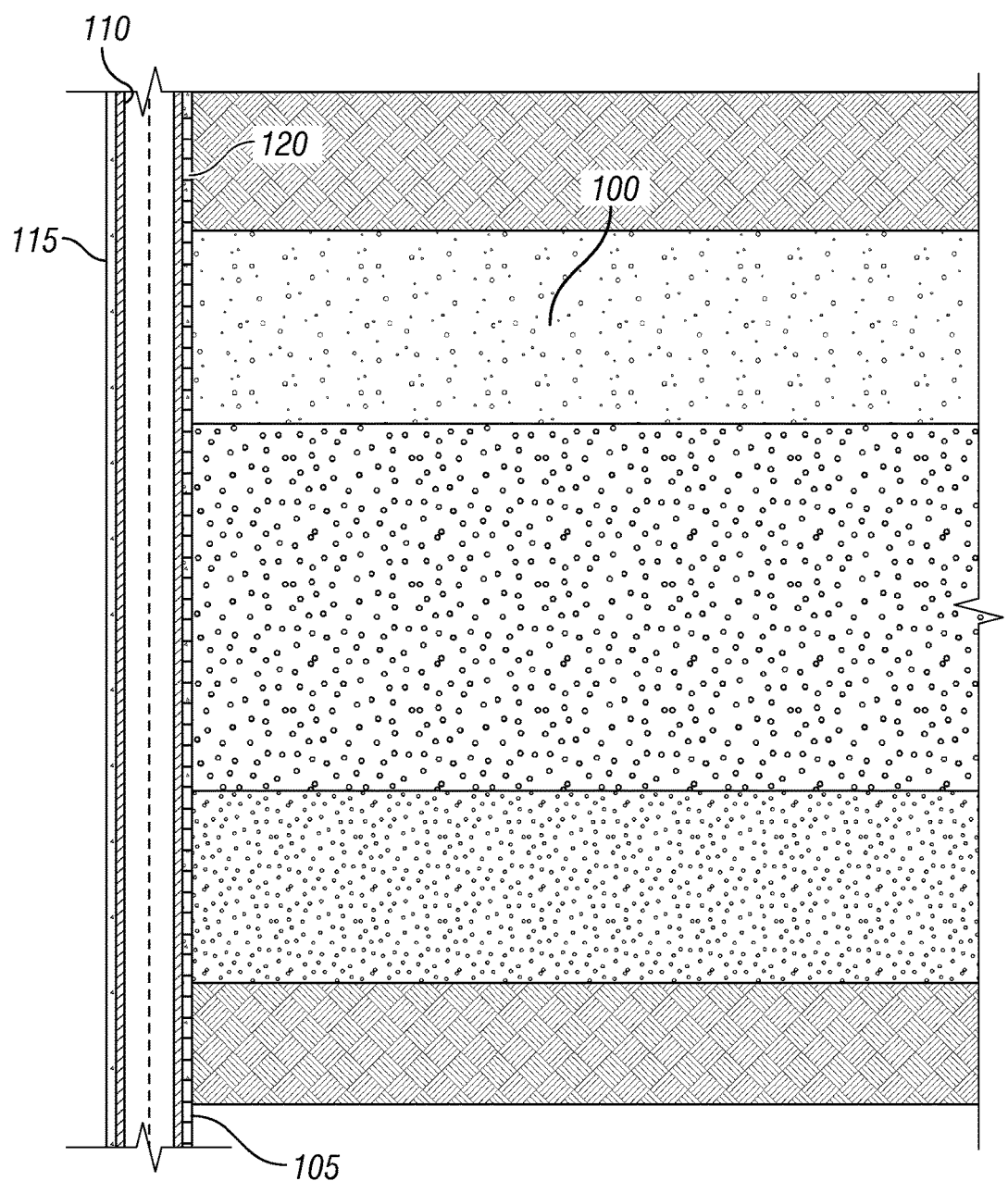
FIG. 3 is a schematic view of an electrode array behind an insulated casing and cement. The electrodes contact the formation and are insulated on all sides except the one contacting the formation.

It will be appreciated that the type of completion of the borehole can play a major role in the robustness of electrical measurements. Generally, an ideal electrode array would contact the formation behind an insulated casing as seen in FIG. 3 where a metal casing 110 insulated by insulation 115 is provided in a borehole 105 traversing a formation 100, and an electrode array 120 is provided between the insulation 115 and the formation 100. The presence of a metallic casing 110 provides a large conductive pathway effectively making the casing a large, nearly uniform, potential electrode. Consequently, vertical resolution is lost.

The second alternative is to place an electrode array tool within a partly conductive fluid-filled borehole. Naturally, the details of the placement of the electrodes and the surrounding fluid becomes a part of the forward calculation. For robustness, these are conducted best in an open-hole completion (see, e.g., Kuchuk et al., *Determination of In Situ Two-Phase Flow Properties Through Downhole Fluid Movement Monitoring*, SPE. Res. Eval. Eng. 13 (4), 575-587 (2010); Zhan et al., *Characterization of Reservoir Heterogeneity Through Fluid Movement Monitoring With Deep Electromagnetic and Pressure Measurements*, SPE Res. Eval. Eng. 13, 509-522 (2010)).

In one embodiment, the solution to equation (31) may be illustrated in terms of voltages obtained with specific current injections. It can be assumed that $N_L$ independent voltages are obtained for each time stamp $t_i$, and this is denoted as $V_{mi}$. The total number of time stamps is $N_T$. Then $(N_L N_T)$ voltage values are available as measurements, in addition to pressure, and possibly layer flow-rates. The flow-rates may be obtained continuously or again at specific time points. According to one aspect, during inversion, these values are matched as closely as possible according to a prescribed error criterion discussed hereinafter.

Turning now to gravity measurements, it will be appreciated that a gravity tool measures acceleration due to gravity, or more appropriately, a change in the acceleration due to gravity between two points along the well-bore. This change may be related to the density of the formation interval. The equations relating the measurement to the formation density are derived as follows. Since gravity is described by a potential field, the acceleration due to gravity may be computed additively.

In one embodiment it is assumed that the Earth is spherical with each stratum considered as being substantially a spherical shell. For measurements, with a radius of influence much smaller than the radius of the Earth, the strata may be regarded as planar structures. If all acceleration due to gravity is regarded as a measurement with respect to an undisturbed Earth's background, then the change may be computed in cylindrical coordinates by replacing the density field with a change in the density with respect to the background. Thus, a change is computed in cylindrical coordinates, whereas the background is in spherical coordinates.

In spherically symmetric shells, the change in the acceleration due to gravity is given by the Earth's background density as a function of radial position. This can be denoted as $g_E(r_s)$, with $r_s$ being radius in a spherical coordinates. Using the well-known result that the acceleration due to gravity is independent of spherical shells at radii greater than the one of interest, and that spherical shells may be treated as a point mass at the center, the gravitational acceleration to the center of the Earth can be described as $$g_E(r_s) = \frac{4\pi G}{r_s^2} \int_0^{r_s} \rho_E(\eta) \eta^2 \, d\eta, \quad (32)$$

where $\rho_E(r_s)$ is the density of the undisturbed Earth and G is the universal gravitational constant. Differentiating with respect to $r_s$ yields $$\partial_{r_s} g_E = 4\pi G \rho_E(r_s) - \frac{8}{3}\pi G \bar{\rho}(r_s), \quad (33)$$

where $\bar{\rho}(r_s)$ is the average density of the Earth's core of radius $r_s$. The above result represents the background Earth-induced gradient in gravitational acceleration.

For a layered medium that is predominantly parallel to the strata surfaces, the changes that occur are on a length scale that are small compared to the radius of the Earth. On these length scales, the surfaces are axisymmetric and planar, and a result that constitutes a perturbation from $\partial_{r_s} g_E$ of equation (33). It may be obtained by using cylindrical coordinates.

Let the cylindrical radial coordinate be r. The vertical coordinate is z, but given the large radius of the Earth, z may be identified with $r_s$ after a translation. In this system may be written $$\delta_\rho(r,z;t)=\rho(r,z;t)-\rho_E(r_s)=\rho(r,z;t)+\rho_E(R_E-z_0+z), \quad (34)$$

where $z_0$ is the Earth's radius at z=0, below which no change in density occurs and $R_E$ is the radius of the Earth. The change (denoted by operator $\delta$) in the vertical component at a height z is $$\delta g_z(z;t) = \int_0^{R_E-z_0} \int_0^\infty \frac{2G\delta_\rho \pi r}{[(\eta-z)^2+r^2]^{3/2}}(\eta-z)d\eta dr, \quad (35)$$

where $\eta$ is the dummy vertical coordinate, and $\delta_\rho$ depends on both r and $\eta$. The change in the vertical component of gravity is thus directly related to alteration in density. It may therefore be used to infer phase replacement or compositional changes. In reality, the measurement is an array of numbers for station points z and at specified times.

In traditional methods, the above formula Eq. 34 is used to reconstruct $\delta_\rho$ that best fits the data. No specific restriction or physical constraint is imposed. Often strong regularization methods are used to ensure that the reconstruction is sufficiently soft. However, this ignores the issue that near physical discontinuities are often present and are reflective of the displacement physics. Moreover, checks on violation of fundamental laws are not easily imposed, because these are not always possible in terms of explicit specifications for spatial and temporal variations of density. It should be appreciated that the density variation should not be arbitrarily generated merely by requiring that a borehole measurement be satisfied through an optimization measure.

In one embodiment, the deviation of density from the background baseline or initial state, is a function of T, $p_n$, $p_w$, $w_{ni}$ and $w_{wi}$ and the local saturation $S_w$. Relevant thermodynamic equations of state relate the phase densities to intensive variables. Thus, the local densities are given by $$\rho_n=\hat{\rho}_n(p_n,T,w_{ni}), \quad (36)$$

and $$\rho_w=\hat{\rho}_w(p_w,T,w_{wi}), \quad (37)$$

where the arguments, as discussed before, are solutions given for each t and position vector x. The local density is then $$\rho=\rho_n\phi(1-S_w)+\rho_w\phi S_w+\rho_r(1-\phi). \quad (38)$$

If the background is known, which incidentally is the density distribution at t=0, $\delta_\rho$ is obtained by subtracting this background from the result of Eq. 38.

If the measurement corresponding to an initial state before any displacement of fluids is unavailable, equation (35) may be used between any time measurements. This is done by applying equation (35) for the two time points successively, and noting that the background due to the Earth cancels out. Again, it should be noted that deformation issues can be considered to be secondary. Otherwise, bulk deformation impact on density should be considered. In one embodiment it is assumed that changes due to saturation are more significant than changes due to deformation.

Considering now azimuthal variability, when axisymmetry is not satisfied, equation (34) is replaced to include $\theta$ variability. $\delta_\rho$ will depend on all three coordinates. Then, $$\delta g_z(z;t) = \int_0^{R_E-z_0}\int_0^\infty\int_0^{2\pi} \frac{G\delta_\rho r}{[(\eta-z)^2+r^2]^{3/2}}(\eta-z)d\theta d\eta dr. \quad (39)$$

All of the variables such as pressures, temperature, saturation and composition will depend on r, $\theta$ and z. An equivalent result may be derived in any other coordinate system of choice.

For inversion, the zero time $g_z$ measurement is subtracted from the subsequent time data. These form distinct gravity measurement at all station points in z coordinate to be compared with the above computation. Little additional information is required.

Gradiometry involves the computation of gradients of the acceleration due to gravity. The most common application involves measurement of variations in $g_z$, or equivalently $\delta g_z$, along a surface trajectory. These are easily obtained from the above formulas by differentiation.

Considering now acoustic tools and measurements, it will be appreciated that a geophone or a hydrophone transmits a displacement given an electrical pulse. The form of the acoustic signal may be decomposed into a range of frequencies about a peak frequency, whose amplitude is the largest. Both compressional and shear modes propagate through the reservoir, and are detected by receivers, and waveforms are obtained. A multitude of methods may be used to process this data, and are discussed in some detail U.S. patent application Ser. No. 13/882,423 Altundas et al., which is hereby incorporated by reference herein in its entirety.

The effective acoustic velocities may be computed through a sequence of steps. First the fluid modulus is computed based on isothermal compression. This requires an equation of state for density. A second equation is needed for describing the ratio of specific heats at constant pressure and constant volume, i.e., $\gamma_w$ for the wetting phase and $\gamma_n$ for the nonwetting phase as a function of pressure, temperature and composition. Thus, the following equations are provided:

$$\gamma_w=\hat{\gamma}_w(p_w,T,w_{wi}), \quad (40)$$

and $$\gamma_n=\hat{\gamma}_n(p_n,T,w_{ni}). \quad (41)$$

The isothermal compressibility $\kappa_T$ and isentropic compressibility $\kappa_S$ for the phases are indicated with additional subscripts n and w so that $$\kappa_{wT}=\frac{1}{\rho_w}\frac{\partial\hat{\rho}_w}{\partial p_w} \text{ and } \kappa_{w-nT}=\frac{1}{\rho_n}\frac{\partial\hat{\rho}_n}{\partial p_n}, \quad (42)$$

and $$\kappa_{wS}=\frac{1}{\gamma_w\rho_w}\frac{\partial\hat{\rho}_w}{\partial p_w} \text{ and } \kappa_{nS}=\frac{1}{\gamma_n\rho_n}\frac{\partial\hat{\rho}_n}{\partial p_n}. \quad (43)$$

In the above expressions the arguments for the functions $\hat{\rho}_w$ and $\hat{\rho}_n$ remain as $(p_w, T, w_{wi})$ and $(p_n, T, w_{ni})$ respectively. The corresponding fluid phase moduli are denoted by K and are $$K_w=1/\kappa_{wS}, \text{ and } K_n=1/\kappa_{nS}. \quad (44)$$

It will be appreciated that the moduli as above vary with pressure, temperature, and the phase composition.

The next step is to calculate the fluid phase modulus through $$\frac{1}{K_f} = \frac{S_w}{K_w} + \frac{1 - S_w}{K_n}. \tag{45}$$

Two moduli are now defined representing the solid ($K_s$) and the assembly of solid in a porous matrix without any fluid present in the interstices ($K_d$), also called dry modulus. The dry modulus is dependent on the mineralogy, stress, the fluid pressure, and temperature besides the pore shape geometry and cementation characteristics. For an intergranular pore system, an expression for the dry modulus is $$K_d = K_s \left(1 - \frac{\phi}{\phi_c}\right)\left(1 - \frac{\phi}{\phi_s}\right) D_1(\eta, m), \tag{46}$$

where $\Phi_c$ is a critical porosity, and $\Phi_s$ is a parameter such that $\Phi_s > \Phi_c$. When $\phi = \Phi_c$, $K_d = 0$. The correction function $D_1(\eta, m)$ accounts for the aspect ratio of the pores and the degree of consolidation. Spherical pores would tend to push this correction to values greater than unity, and aspect ratios greater than the characteristic intergranular pore systems would have values of $D_1(\eta, m)$ lower than unity. From $K_d$, the effective bulk density of the porous saturated solid is estimated from $$K_e = K_d + \frac{\left(1 - \frac{K_d}{K_s}\right)^2}{\frac{\phi}{K_f} + \frac{1-\phi}{K_s} - \frac{K_d}{K_s^2}}. \tag{47}$$

The resulting p-wave velocity is $$V_p = \sqrt{\frac{K_e + \frac{4}{3}G_d}{\rho}}, \tag{48}$$

where $G_d$ is the shear modulus of a dry rock given by a relationship similar to that of equation (46), and the density is the effective density of the medium. The dry shear modulus is the same as that of a fluid saturated rock. The shear velocity is $$V_s = \sqrt{\frac{G_d}{\rho}}. \tag{49}$$

To compute the dry moduli for a given mineralogy and porosity, it is useful to know the mean stress $$\frac{1}{3}\tau_{ii},$$

the fluid pressure p, and the temperature T. The choice of fluid pressure is ambiguous when multiple phases at different pressures are present within the medium. If the displacement changes the pressure only in a perturbative manner, material properties of the dry rock remain unchanged. Thus, for example, the intrinsic moduli would not change but the effective modulus would. In the above set of equations, $K_s$ would be unaffected during displacement, $K_f$ would change due to changes in saturation, pressure, and temperature (primarily because of some of the fluid constituents may be compressible, as opposed to slightly compressible, where $\kappa P \ll 1$, P being a characteristic pressure). Since in one embodiment it is assumed that the rock is only elastically and slightly deformable, $K_d$ does not change with time, but $K_e$ would change in time due to changes in $K_f$.

Once the bulk and shear moduli are known with respect to (x, t), or the velocities are known, a number of methods may be used to compute the response at an acoustic receiver resulting from a stimulus from an acoustic source. A full waveform calculation solves a set of elastic media equations for displacement, whereas a simpler version would solve an eikonal equation. Ray tracing is a further simplification, and is similar to replacing the wave propagation with a ray that is refracted and reflected at every interface. This process is iterative, since a ray direction that reaches the receiver from the source is not known a priori. According to one aspect, the eikonal solver is considered to be quite efficient and provides the time of arrival consistent with the full wave-form computation. Since attenuation of an acoustic wave especially at mid-frequencies (above seismic) is not known from first principles, the use of an eikonal solver is often sufficient and robust. For completeness, the governing equations for both of the methods are provided. The basics of the derivation for a linear elastic medium is seen in Achenbach, J. D. *Wave Propogation in Elastic Solids*, North-Holland Pub Co. (1973).

In the full waveform method, starting with the governing equations of an elastic medium, by Hooke's law the stress tensor $\tau$ is related to the strain E through the elastic modulus C so that in Cartesian component form $$\tau_{ij} = C_{ijkl} E_{kl}. \tag{50}$$

Since $\tau_{ij}$ is symmetric, and so is the strain tensor, for an isotropic elastic medium, the application of symmetry leads to the stress-strain relation in terms of the Lamè coefficients (as demonstrated by Cauchy)

$$\tau_{ij} = \left(K_e - \frac{2}{3}G_d\right) E_{kk} \delta_{ij} + 2 G_d E_{ij}. \tag{51}$$

The usual Einstein convention for repeated sum is to be understood.

$$\left(K_e - \frac{2}{3}G_d\right)$$

is the first Lamè parameter $\lambda$, and the shear modulus $G_d$ is the second. The strain tensor is obtained from displacement u via $$E_{ij} = \frac{1}{2}(\partial_i u_j + \partial_j u_i), \tag{52}$$

where the subscripts for E and u are the cartesian indices and with $\partial_i$ denoting partial derivatives with respect to the $i^{th}$ coordinate. For small displacements, the law of motion may be written without regard to a reference coordinate or a material coordinate. Thus, the statement of Cauchy's first law of motion (equivalently, Newton's second law) amounts to $$\tau_{ij,i} + \rho g_j = \rho \partial_{tt} u_j. \tag{53}$$

Replacing $\tau_{ij}$, the displacement equation for an elastic medium may be obtained as $$G_d u_{j,ii} + (\lambda + G_d) u_{i,ij} + \mu g_j = \rho \partial_{tt} u_j. \tag{54}$$

Since any vector may be decomposed into curl free ($\nabla \xi$) and divergence free ($\nabla \wedge \zeta$) components $$u_i = \partial_i \xi + \varepsilon_{ijk} \partial_j \zeta_k, \tag{55}$$

where $\varepsilon$ is the permutation symbol, and the first term on the right hand side is curl free and the second term is divergence free. Replacing equation (55) in equation (54), two equations governing the longitudinal and the transverse wave respectively are obtained $$\partial_{tt} \xi = \left( \frac{\lambda + 2G_d}{\rho} \right) \xi_{,ii} \tag{56}$$

$$\partial_{tt} \zeta = \left( \frac{G_d}{\rho} \right) \zeta_{,ii}. \tag{57}$$

The usual tensor notation of comma in the subscript for gradient operator has been used. Since the first Lamè coefficient $\lambda$, is $$K_e - \frac{2}{3} G_d,$$

it is seen that me wave equations give the two equations representing p-wave and s-wave velocities given by equations (48) and (49). However, since the rock comprises the solid, and possibly multiple fluids, in one embodiment, the properties are replaced with effective values through homogenization theories to get $$\partial_{tt} \xi = \left( \frac{K_e + \frac{4}{3} G_d}{\rho} \right) \xi_{,ii}, \tag{58}$$

$$\partial_{tt} \zeta = \left( \frac{G_d}{\rho} \right) \zeta_{,ii}. \tag{59}$$

In full waveform numerical calculations, equation (54) along with material conservation equation are solved to obtain $u_i(x, t)$ for given initial and boundary conditions. The displacement calculations may be compared with a measurement for error estimates. Multiple measures are possible, but the central problem with full waveform methods is the distortion of the waveform due to the measurement system, and more importantly the unknown extent of attenuation. Attenuation is an intrinsic energy loss mechanism and affects the higher frequencies more than the lower ones, thus distorting the waveform. A straight-forward computation of travel time is often a more appropriate measure for comparison with experimental data, provided unambiguous evaluation of the travel time may be obtained from the sensor responses.

The eikonal equation may be obtained under special circumstances, and allows for the direct computation of the travel times. It is familiarly known as geometrical theory. For an interval where the wavelength is large enough that the medium appears locally homogeneous, the voids and the solids are not distinguished, and is small enough that the wavefront may be traced as rays, the small wavelength approximation may be carried out. Under these conditions, first arrivals are of interest. For a sufficiently small attenuation where a full waveform comparison may still be problematic, but the wavefront arrivals are not significantly affected, this approximation may be considered an excellent compromise.

With $\iota^2 = 1$, and starting with equation (58), the following is obtained:

$$\xi(x,t) = \Xi(x) e^{-i\omega(t - A(x))}. \tag{60}$$

The arrival time at x is to be regarded as A(x). Substituting in equation (58), the governing equation for $\Xi$ and A becomes $$-\omega^2 \Xi [(A_{,i})^2 - 1/V_p^2] + i\omega [2\Xi_{,i} A_{,i} + \Xi_{,ii}] = 0. \tag{61}$$

The arguments for $\Xi$ and A have been suppressed. The small perturbation parameter being $\omega$, the leading order governing equation for travel time becomes $$A_{,i} A_{,i} = 1/V_p^2. \tag{62}$$

This is the eikonal equation, the solution to which is the arrival time. The time A(x) may be compared with the measurements. The experiment may be repeated as often as desired, in which case, the time scales over which the experiment is conducted may be regarded to be much larger than the time scales for propagation. Thus, the data are collected at discrete time points denoted as $t_i$. A(x) will be different for each $t_i$, and is thus better represented as $A(x; t_i)$.

The physics of most well-bore measurements are based on open-hole, meaning that there is no conductive casing within the well-bore. However, in the presence of a cased-hole, the most suitable measurements for continuous logging are based on nuclear physics. While not impervious to the presence of a steel casing, these data can be corrected to reduce casing effects. A tool useful for conducting such logging is the Reservoir Saturation Tool of Schlumberger, (RST and RSTpro being trademarks of Schlumberger Technology Corporation) which is slim and robust enough to make a measurement through tubing.

The primary application of the RST tool has been to infer water saturation from the carbon-oxygen ratio (C:O) from inelastic spectroscopy. Replacement of hydrocarbon by water in the formation reduces carbon while elevating oxygen. In $CO_2$ storage applications however, the C:O ratio is marginally changed from zero to a half, unlike oil-field application where the ratio moves from infinity to zero. Therefore in $CO_2$ applications, the primary measurement would be that of capture cross-section reduction, and for purposes of this disclosure, that application is described in detail. For the oil-field, C:O is useful and may be used in a similar fashion, although it is not explicitly described herein.

The capture of thermal neutron (denoted $S$) is facilitated by Cl in the water, and its replacement by $CO_2$ reduces $S$. This was utilized in the first application of RST in $CO_2$ sequestration (see, e.g., Müller et al., *Time-Lapse Carbon Dioxide Monitoring With Pulsed Neutron Logging*, International Journal of Greenhouse Gas Control 1(4), 456-472 (2007); Sakurai et al., *Monitoring Saturation Changes for $CO_2$ Sequestration: Petrophysical Support of the Frio Brine Pilot Experiment*, Petrophysics 47(6), 483-496 (2006)).

Knowing the fluids and their composition around the borehole facilitates computation of borehole corrections. The principles behind the operation of the RST are given by Plasek et al., *Improved Pulsed Neutron Capture Logging With Slim Carbon-Oxygen Tools: Methodology*, SPE30958 (1995).

The capture cross-section is affected by a number of factors: the lithology or the composition of the matrix, the porosity, and the pore-filling fluids and their components. The matrix capture cross-section depends on the mineral constituents and their respective molar concentrations, and for a nonreacting system, it suffices to simply denote this as $\mathcal{S}_M$, for in a time-lapse measurement, the baseline is subtracted. In one embodiment, only changes in saturations and the concentrations matter. In a two-phase system, the aggregated capture cross-section is $$\mathcal{S} = (1-\phi)\psi_M \mathcal{S}_M + \phi S_w \psi_w \mathcal{S}_w + \phi(1-S_w)\psi_n \mathcal{S}_n, \quad (63)$$

where $\mathcal{S}$ are per mole, and $\psi$ are molar concentration of each of the phases, including the matrix. Fluid transport is best tracked by lumping components that are relevant from a compositional point of view. For example, when electrochemical potentials are irrelevant, it is convenient to consider NaCl as a component rather than separating it into ions. But from a nuclear point of view, elements affect the response. For a neutron measurement, where charge is again of no consequence, it makes little difference if capture cross-section is assigned to molecular components i as opposed to the constituents of the molecule. Then, $$\mathcal{S}_w = \Sigma_i y_{wi} \mathcal{S}_{wi} \text{ and } \mathcal{S}_n = \Sigma_i y_{ni} \mathcal{S}_{in}, \quad (64)$$

where $y_i$ are the mole fractions of components i in the phases w and n. The relationship between $y_i$ and $w_i$ is known from simple algebra and for both phases $$w_i = \frac{y_i M_i}{\Sigma_i y_i M_i} \text{ and } y_i = \frac{w_i/M_i}{\Sigma_i w_i/M_i}. \quad (65)$$

Both $\psi_w$ and $\psi_n$ are determined once p, T, and $y_i$ in each of the phases is fixed from the applicable thermodynamics. For example, knowing the equation of state allows knowledge of the density from p, T and $w_i$ for any of the phases. From $w_1$, $y_i$ is also obtained and therefore the mixture molecular weight is known for each of the phases. The ratio of $\rho$ to the molecular weight gives $\psi_w$, $\psi_n$, and $\psi_M$ for the three phases considered.

The time lapse measurement is considered simple. Between the measurement at t and the baseline $$\Delta\mathcal{S} = \Delta(\phi S_w \psi_w \mathcal{S}_w) + \Delta[\phi(1-S_w)\psi_n \mathcal{S}_n]. \quad (66)$$

In some applications, $\phi$, $\psi_w$, $\psi_n$, $\mathcal{S}_w$, and $\mathcal{S}_n$ may remain unchanged over the time interval of interest. Then change in saturation may be inferred from $$\Delta S_w = \frac{\Delta \mathcal{S}}{\phi(\psi_w \mathcal{S}_w - \psi_n \mathcal{S}_n)}. \quad (67)$$

For comparative purposes the measured $\Delta\mathcal{S}$ minus the computed value defines the error or the residual for the nuclear data. In general, other data may also be considered. A carbon to oxygen ratio (C:O) may also be used to define the residual in water-oil displacement problems.

Equivalent to using capture cross-section, the hydrogen index $\mathcal{H}$ may be used and is a measure of the number of moles of hydrogen per unit volume. Measurement of $\mathcal{H}$ is not easily carried out through tubing, but nevertheless is a measurement made possible by a neutron-neutron log. A commercial measurement in open-hole is provided by the accelerated porosity sonde (APS, a trademark of Schlumberger Technology Corporation) and is applicable through casing provided appropriate accounting of the casing is taken. A shift in hydrogen index, $\Delta\mathcal{H}$ may be related to the change in saturation. This is potentially useful when capture cross-section alone is not enough to quantify saturation change, e.g., when $\psi_w$ and $\psi_n$ may also change (see equation (66)). The change in hydrogen index is $$\Delta H = \Delta(\phi S_w \psi_w \mathcal{H}_w) + \Delta[\phi(1-S_w)\psi_n \mathcal{H}_n]. \quad (68)$$

Thus far it has been shown how a diverse set of measurements may be brought together with a compact parameter set. In one embodiment, an underlying assumption is that the system is a microscopically homogeneous system, i.e., that the pore size distribution is unimodal once clay contributions to pore volume are removed.

For the purposes of inversion, flow disturbances are imposed in segments of injection well(s). These are to be regarded as specifications of boundary conditions. For these disturbances, and a given set of parameters as previously set forth, pressure, temperature, saturations, and compositions may be calculated for all (x,t) within the reservoir. For all stimuli causing responses to occur, the equations governing the behavior may also be solved, since the material properties for these are obtained from the relationships (equations) previously given. As an example, the aqueous fluid conductivity may be calculated from $(p_w,T,w_{wi})$, from which the effective conductivity may be obtained (see equation (28)). Similarly, the density, bulk and shear moduli are known, and therefore gravity and acoustic responses are determinable. A gravity measurement may also mean gradiometry where one is interested in the change in the gradients of the Earth's gravity $g_z$.

For generality, the data is grouped with arguments that denote the well and the segment within the well or surface trajectories and the position in the surface trajectory. In one aspect, the latter is useful in surface seismic or gradiometry. Thus, the first argument is denoted W with the second argument I. The trajectory number is W and I is a position or a segment interval in the trajectory. The third argument is the time stamp, $t_j$, which may depend upon W, I and K, where K is the index of the measurement type. The argument W may also involve pairs of wells, and when it does so, a new number is designated for it. The intervals may also be in pairs, as in a cross-well acoustic measurement or a source-receiver pair, which again will involve a new index. Thus, if there are two wells with two intervals in each, with single and paired measurements, there will be three W values, the third one representing the (1,2) pair. The intervals would be eight, each interval counting for four, and pairs counting another four. The (1,2) pair, owing to reciprocity, is the same as (2,1). But since verification of reciprocity may be a part of the process, distinct indices are kept for them. Also, for convenience, the data are labeled with discretized time stamps, without restriction to discrete time measurements. The temporal spacing may be as short as needed to accommodate "continuous" data.

The parametric argument, shown as K, denotes the type of data. Broadly, the classes are those related to fluid dynamics and mass transport such as pressure, temperature, flow rate, mass fractions, and mass flow rates of components, electrical responses of the type considered here that include current and voltage amplitudes, acoustic behavior meaning displacement trace or time of arrival, nuclear property change meaning a shift in $\mathcal{S}$, C:O, and $\mathcal{H}$, and density changes as reflected by the gravimetry or gradiometry. Each type may be binned to be in a different classification for convenience. Within each type, the data may be a combination of different measurements, an example of which may be pressure and flow rate (although this might be rare). To be sufficiently general, the data are shown as $\mathcal{M}(W, I, t_j; K; L)$, where L is the data type within a given class (e.g., pressure within transport). Corresponding calculated responses are $\mathcal{R}(W,I,t_j;K;L;\beta)$, where $\beta$ is the vector consisting of parameters to be determined. The error is the difference between $\mathcal{M}$ and $\mathcal{R}$ that is minimized with respect to $\beta$ as a part of the optimization process. For a Gaussian error, maximum likelihood implies that the error is the sum of squares of the differences with appropriate weights for the different types of measurements, the weights being the inverse of the variance. In the absence of error information, use of variance becomes somewhat arbitrary, and it is usually convenient to scale the errors by using a normalizing factor equal to the measurement itself.

It is also likely that the number of measurements for each type (say K=1, K=2, etc.) will not be the same. A good example is that the number of pressure measurements at each time step will be only in packed-off intervals, whereas the number of voltage measurements will depend on the number of electrodes $N_e$. In a single well acquisition, the number of independent electrode data is $N_e(N_e-1)/2$ for each time $t_j$, if each electrode is used as a source in a rapid sequence and the voltage at the source is not used. A disproportionate weighting towards the larger data set will result. An extreme example occurs during injection where a single well-bore pressure is obtained with numerous electrode array data points. The pressure data is usually more relevant for permeability. Adding more pressure data acquired within the same well-bore interval adds only to the redundancy of data, since these are largely just offsets from each other by the dictates of well-bore static gradient and to a lesser extent by the dynamics. Also, pressure is dominated by the integrated permeability-thickness product, and the delineation between layer permeabilities is mainly reflected in the layer flow-rate or electrical-acoustic-gravimetric data, affected by different layer uptakes of injected fluid. Thus, in a vertically homogeneous formation, it is appropriate to weight all of the electrical data on an equal footing with pressure and layer flow-rates, although this is not necessarily so with a heterogeneous formation. A reasonable compromise is to take into account the number of strata $N_s$, and assign a weight roughly proportional to the dominant information contained in each type of dataset. Accordingly, in the context of Table 3, there are $12N_s$ parameters in addition to an $N_s$ array of M. The merit of each type of measurement is deciphered by first evaluating the number of independent parameters that is invertible by the data type on its own merit. In particular, let this be Y(K). For each type of measurement, Y(K) is inferred from the diagonally dominant rows of a cross-correlation matrix of inverted parameters or through singular value decomposition. This can be carried out through model simulated synthetic results. In one embodiment, weights are obtained by accounting data for all $t_j$ points for which data are likely to be available and all of the W and I. Thus $\omega(K)$, contains the assimilated relevant information content in each type of measurement.

For error minimization error is defined by $$\varepsilon(W,I,t;K;L;\beta) = \omega(K)[\mathcal{M}(W,I,t;K;L) - \mathcal{R}(W,I,t;K;L;\beta)]^2, \quad (69)$$

where $\omega(K)$ are the weights with respect to type K measurement as discussed previously. It should be noted that in equation (69), the error is defined for an arbitrary time t. According to the previous suggestion $\Sigma_K \omega(K)=1$, with $\omega(K) \propto Y(K)$. According to one embodiment, the error of equation (69) is summed over all W, I, $t_j$, K and L.

According to one aspect, while summing over W, I, K and L may be expected, summing over $t_j$ is not expected because not all measurements are available at the same time. For example, acoustics experiments may be carried out at very specific time points when the wells are available, while logging runs for different tools may be conducted at different times. Indeed, the timing of experiments is largely dictated by operational constraints and cost. In addition, for numerical stability, flow simulations are carried out in implicit schemes, and the time points are dictated by algorithms. It is therefore desirable to compute an error that does not rely on specified time points. It is also useful to accumulate error as a continuous function of t. A measure for the cumulative total error is therefore given as $$\varepsilon_T = \int_0^t \Sigma_{W,I,K,L} \varepsilon(W,I,t;K;L;\beta) dt. \quad (70)$$

Using equation (69), $\varepsilon$ is replaced to obtain $$\varepsilon_T = \int_0^t \Sigma_{W,I,K,L} \omega(K) \{\mathcal{M}(W,I,t;K;L) - \mathcal{R}(W,I,t;K;L;\beta)\}^2 dt. \quad (71)$$

The time points $t_j$ become irrelevant at this stage. Any convenient method may be chosen to carry out the integration, and the responses are also obtained through a suitable interpolation method, at the time points where the integration requires function evaluation. In one embodiment, a trapezoidal method, with linear functional interpolation is considered adequate. This allows flexibility for variable integration time steps. For each W, I, K, and L, $t_j$ values are chosen to be the nodes, for which $\mathcal{R}$ is obtained through linear interpolation. For computation, $$\varepsilon_T = \frac{1}{2} \sum_{W,I,K,L} \omega(K) \sum_{j=1} [\{\mathcal{M}(W, I, t_j; K; L) - \mathcal{R}(W, I, t_j; K; L;\boldsymbol{\beta})\}^2$$

$$+ \{\mathcal{M}(W,I,t_{j-1};K;L) - \mathcal{R}(W,I,t_{j-1};K;L;\beta)\}^2](t_j - t_{j-1}). \quad (72)$$

It should be appreciated that $t_j$ may depend upon the type of measurement and its location. Any well-known algorithm may be used for minimizing $E_T$ with respect to parameters $\beta$. These algorithms may also be used with constraints or bounds. Many such algorithms are extensions of a nonlinear least squares algorithm where the distribution of deviation from the theory behaves as "white noise." The damped version of the least squares algorithm is known as the Levenberg-Marquadt algorithm.

Figure 4:
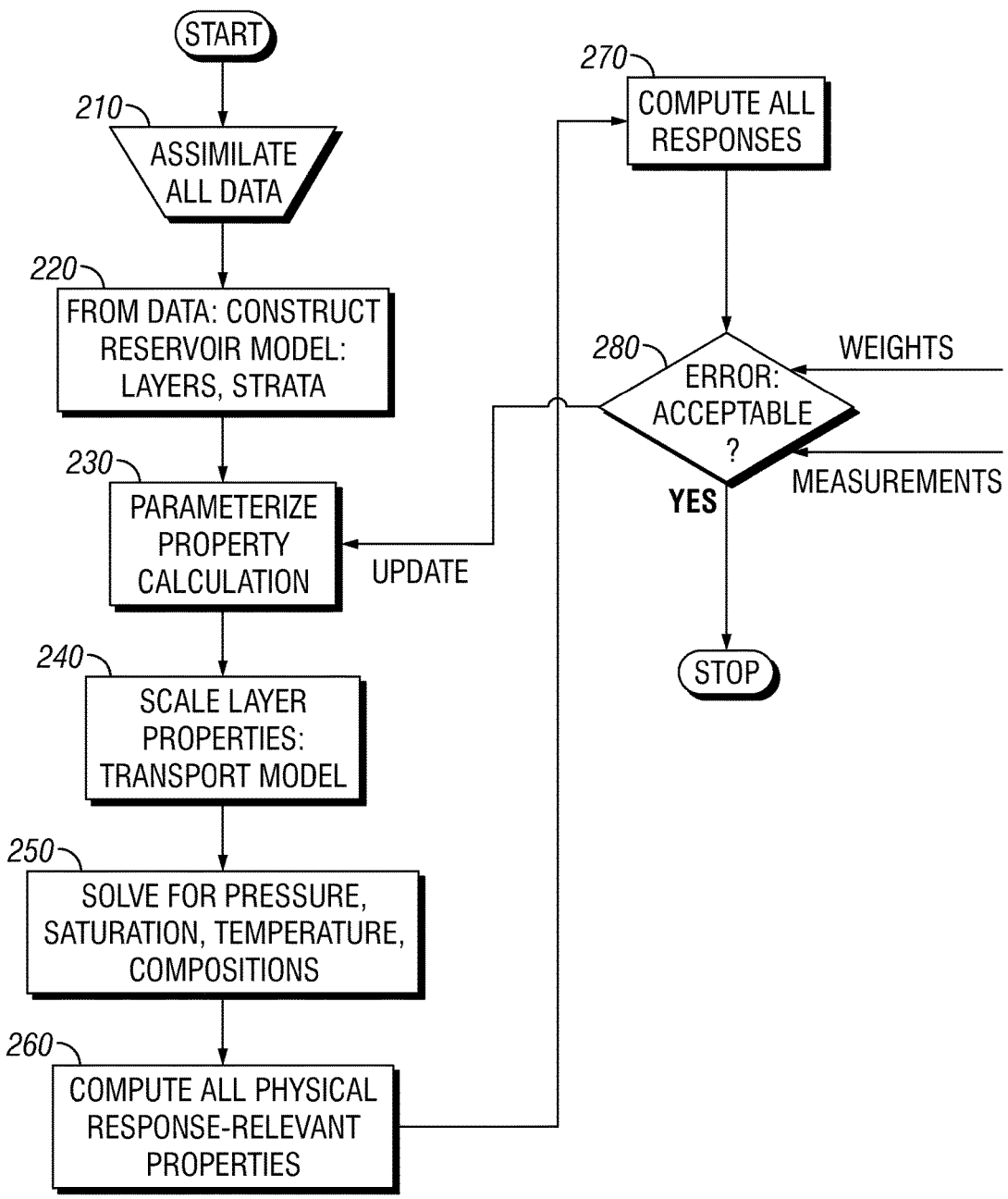
FIG. 4 is a flow chart of iterative optimization for the integrated parameterization estimation.

Turning now to FIG. 4, according to one embodiment, at 210, data is accumulated from all sources such as open-hole logs, seismic tests, and surrounding well data. At 220, the simplest possible stratigraphic model that reasonably honors the data is constructed. For example, if data from two wells are available but no seismic information is available, all stratigraphic constructions are based on linear interpolation with planar boundaries. However, if seismic information is available, the seismic information will be used to set boundaries consistent with the information from the logs. At 230, values are assigned for the parameters of a fundamental parameter set (e.g., one of the sets set forth in Tables 1 or 3), thereby allowing for property calculation. The values may be assigned by assuming values (e.g., picking values within the ranges set forth in Tables 2 or 4) and/or by using the open-hole logs and other data to provide the best possible approximations for porosity, saturations, and transport properties using an underlying petrophysical model. A number of methods may be used. In one embodiment, joint interpretation of several logs is used to infer these property values. The homogeneous version of the carbonate model, combined with multiphase inversion based on array induction measurements or its time-lapse version are used to assign petrophysical property values. The inferences for permeability utilize nuclear magnetization relaxation (NMR), and may be calibrated with data from a formation tester tool. Additionally, for aquifers, methods to infer residual saturations have been disclosed in U.S. Ser. No. 12/909,116 which is hereby incorporated by reference herein in its entirety, and this is useful for estimating initial guesses of values for $S_{wr}$ and $S_{nrm}$ (the maximum residual nonwetting phase saturation), if no other information is available.

At 240, a first approximation stratigraphic model with the assigned property values is constructed. In one embodiment, a simple structure (e.g., the simplest possible structure) is constructed, and a property or a combination of properties is/are chosen to identify boundaries. An example would be to choose the porosity or the inferred permeability, or a near well-bore conductivity. In one embodiment, the model is based on permeability because permeability it is sensitive to porosity, pore size, and the tenuous path structure (tortuosity) for flow. In another embodiment, when permeability is not reliably estimated, porosity and mineralogy are used. In another embodiment, when mineralogy is unavailable, porosity alone is used.

In one embodiment, boundaries are chosen by a series of steps starting with constructing the inferred property logs at the well of interest. Then, low amplitude, high frequency noise is filtered (see, e.g., Arakawa, K. et al., *Statistical Analysis of E-Separating Nonlinear Digital Filters*, Electron. Comm. Jpn. Pt. I 66, 10-18 (1983); Moore, D. and Parker, D., *On Nonlinear Filters Involving Transformation of the Time Variable*, IEEE Trans. Inform. Theory 19(4), 415-422 (1973)). Inflection points are identified and ranked according to magnitude. Starting with a minimum number of layers, the position of the layers and their property values are optimized (e.g., using least-squares to minimize error). Then, the number of layers is increased by one, and the steps are repeated until the error improvement in the optimization is deemed marginal. Indeed, in one aspect the increase in the complexity introduced by an increase in the number of layers is weighed against the error improvement so that even if marginal error improvement can be obtained by introducing an additional layer, the reservoir model is deemed to not have that additional layer.

Subsequent to layer demarcation, at 240 the properties are upscaled to have uniform, homogeneous, but anisotropic properties within each layer. The upscaling for porosity conserves volume. The upscaling for relative permeability and capillary pressure can be based on capillary equilibrium within each layer. The vertical permeability and the horizontal permeability can be based on steady flow, perpendicular and parallel to layers. This allows the solving of partial differential equations of transport in a coarsened geometry at 250 as discussed hereinafter.

It should be noted with respect to the upscaling at 240 that subsequent logs or well-bore measurements may be obtained on a finer scale than the layer thicknesses. But since the layers have been constructed such that only low amplitude, high frequency variabilities have been filtered out, and subsequently honoring a least-squares algorithm, it is considered likely that the finer scale measurements should cause little difficulty. However, according to one embodiment, the numerical simulation for different physical problems should honor the geometrical requirements imposed by the measurement sonde. For example, if the electrode dimensions are small compared to the layer thickness, a finer grid will be required to compute voltages correctly. Fortunately, electrical, acoustic, and gravity equations are considered relatively easy to solve compared to the fluid transport, and therefore may be solved in a finer grid.

At 250, using the upscaled layers and parameter values, determinations are made for a plurality of field variables such as pressure, saturation, temperature, and fluid composition using partial differential equations of transport. As an example, starting with the parameters of Table 3, and using the differential equations that govern mass and energy conservation in two-phase flow, i.e., equations (20) and (27) and the corresponding extended Darcy's law given by equations (18) and (19), along with the diffusive flux relationships such as equations (21) and (22), it is possible to solve the system of equations for the unknowns $p_w$, $p_n$, T, $S_w$, and $w_{wi}$ as a function of voxels of the formation (space) over time. This requires initial and boundary conditions to be specified so that these field variables may be calculated as a function of space and time, and the parameters and the parametric functions such as porosity/permeability and capillary pressure/relative permeabilities must be known. For instance, to compute capillary pressure from equation (16), $p_b$ needs to be known. This is calculated from equation (14), where the right hand side has parameters $\phi$, m and k, all of which are based on estimates, so that the first round of iteration may commence. The fluid property $\gamma$ is known from the composition of the fluids, the pressure and the temperature.

Once $p_w$, $p_n$, T, $S_w$ and $w_{wi}$ are computed (based on the assumed parameter set) as a function of space and time, at 260 physical response-relevant properties such as density (see equation (38)), conductivity (see equation (28)), capture cross-section and hydrogen index (see equations (66) and (68)), and acoustic velocities (see equations (48) and (49)) can be computed. The values for these properties will vary with space and time as well. Thus, the material properties that affect electrical, nuclear, gravimetry, and acoustic propagation are known. These however do not constitute the response within boreholes or the surface, but only feed into the response calculation in order to compute that which may be compared to tool measurements. Thus, at 270, tool responses to stimuli (by way of example only, current injections, sonic impulses, nuclear particles, magnetic fields, etc.) are computed. For example, the conductivity distribution in equation (31) would be used to evaluate voltage responses to a given current input. Similarly, a gravimetric response is obtained by including the density distribution in equation (35). Given the complexity of the nuclear tools and the nonlinearity and the extensive computational loading, and the fact that in one embodiment these are relatively shallow measurements, a weighted near wellbore distribution of capture cross-section, density and hydrogen index may be used to estimate responses. For acoustics, as previously discussed, the eikonal equation of equation (62) or equations (58) and (59) for full-wave forms may be used. The output of these numerical simulators and the computed pressures, temperatures and compositions are then jointly compared to weighted (see equation 69)) actual tool measurements, and a total error (equation (72)) is computed at 280. The error thus computed may be used to make an iterative update to the values for the fundamental parameters of Table 3 at 230, using well-known search algorithms for solving a nonlinear least squares problem. The loop of methods described above with respect to 230, 240, 250, 260, 270 and 280 are repeated until the error computed at 280 is deemed acceptable and the process is stopped. It is noted that where one or more particular tools are not being used (e.g., NMR), the weighting of measurements with respect thereto is set to zero.

The result of completing the process of FIG. 4 is the generation of a model of the formation that characterizes the formation in a manner consistent with all measurements, thereby permitting a computation or prediction of how the formation will respond to disturbances or stimuli (e.g., fluid injection for production, carbon-dioxide injection for sequestration, current injection, etc.) In addition, values for various formation parameters are determined, as are values for various field variables. These values may be plotted on paper or electronic equipment and may be presented as logs as a function of depth and/or azimuth. In addition, the time-lapse logs may be presented to indicate change in values of the formation parameters and/or field variables over time.

In one embodiment, the applicability of equation (14) on a layer scale is assumed, even though the layer properties are not isotropic and therefore may lead to ambiguity on the choice of permeability to be used in equation (14). In addition, it is assumed that the effective capillary pressure curve obeys the extended Brooks-Corey relationship.

In another embodiment, the applicability of equation (14) on a layer scale is not assumed, and it is also not assumed that the effective capillary pressure curve obeys the extended Brooks-Corey relationship. More particularly, it is noted that measurements vary along with the well-bore, and therefore they essentially continuously vary with z. They are denoted hereinafter as hatted variables. The starting guesses have a subscript 0, and are for parameters of the second column of Table 3. For example, in the zero'th iteration, the porosity parametric function before scaling to $\phi$ will be $\hat{\phi}_0(z)$ and k will be $\hat{k}_0(z)$. These are up-scaled to get $\phi$, and $k_h$ and $k_v$ in each iteration. The iterative parameters rather than being $\phi$ and k, are $\Lambda_\phi$ and $\Lambda_k$. These are the multiplicative factors that update $\hat{\phi}(z)$ and $\hat{k}(z)$. For updating from $n^{th}$ to $(n+1)^{th}$ iteration for $\phi$, $$\hat{\phi}_{(n+1)}(z) = \Lambda_{\phi(n)}^{(n+1)}(i)\hat{\phi}_{(n)}(z), \quad (73)$$

and similarly to update permeability, the relationship is, $$\hat{k}_{(n+1)}(z) = \Lambda_{k(n)}^{(n+1)}(i)\hat{k}_{(n)}(z). \quad (74)$$

The scaling iterate $\Lambda$ is fixed for each layer i, and for each property is shown as a subscript for $\Lambda$. The process is the same for other parameters such as $\tilde{C}$, $S_{Wr}$, $S_{nrm}$ etc. with corresponding functions $\tilde{C}(z)$, $\hat{S}_{wr}(z)$, and $\hat{S}_{nrm}(z)$. Thus, in each step of the iteration, the updates are carried out for $\Lambda$. The upscaling process is carried out from "scratch" as listed in the bulleted items previously. A new anisotropy is therefore obtained automatically.

If the layer boundaries are the same throughout all iterations, since permeability is multiplied by a uniform value through the layer, anisotropy remains the same. If this is thought to be too restrictive, sublayers may be introduced so that $\Lambda$ is piecewise constant within the layer, and is uniform within the sublayer.

There have been described and illustrated herein several embodiments of methods of determining characteristics of formations using a physiochemical model. While particular embodiments and aspects have been described, it is not intended that the disclosure be limited thereto, and it is intended that the claims be as broad in scope as the art will allow and that the specification be read likewise. Thus, while particular fundamental parameter sets have been described and set forth in Table 1 and modified in Table 3, other modified fundamental parameter sets may be used. It will therefore be appreciated by those skilled in the art that yet other modifications could be made. Accordingly, all such modifications are intended to be included within the scope of this disclosure as defined in the following claims. In the claims, means-plus-function clauses, if any, are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of characterizing an earth formation, comprising:
    a) constructing a reservoir model of the earth formation from data obtained from a plurality of sources, the reservoir model including a plurality of layers;
    b) selecting a predetermined set of fundamental parameters to describe the earth formation, including porosity ($\phi$), pore-to-throat size ratio ($\alpha$), cation-exchange capacity (Qv), and a mineral array (M);
    c) assigning initial values for the predetermined set of fundamental parameters for each of the plurality of layers;
    d) using the initial values for each of the plurality of layers, solving partial differential equations of transport to obtain solutions for a plurality of field variables of the earth formation as a function of space and time for each of the plurality of layers;
    e) computing physical-response-relevant properties as a function of space and time for each of the plurality of layers using the solutions;
    f) computing tool responses using the physical-response-relevant properties;
    g) installing an electrode array between an insulation portion of a metal casing provided in a borehole and a physical formation and obtaining formation measurement information from the electrode array, wherein the borehole is a partly conductive fluid-filled borehole;
    h) comparing the formation measurement information to the computed tool response to obtain an error signal;
    i) modifying the initial values in an iterative process utilizing the error signal and repeating d) with modified values e), f), g), h), and i) in a multidimensional search until the error signal is deemed acceptable, thereby characterizing the earth formation.

2. The method according to claim 1, wherein the field variables include pressure, saturation, temperature, and fluid composition.

3. The method according to claim 2, wherein the physical response-relevant properties include an electrically-based property, a density-based property, an acoustically-based property, and a nuclear-based property.

4. The method according to claim 3, wherein the electrically-based property comprises conductivity, the acoustically-based property comprises p-wave velocity, and the nuclear-based property comprises capture cross-section.

5. The method according to claim 1, wherein
the data obtained from a source comprises a of a plurality of open-hole logs and seismic tests, and
the constructing a reservoir model of the earth formation from data obtained from a source and the assigning initial values comprises
choosing a minimum number of layers for the reservoir model,
filtering high frequency noise from the data,
from the filtered data, identifying inflection points indicating a plurality of layer boundaries,
ranking the inflection points according to magnitude,
optimizing the position of the minimum number of layers and their property values, and
increasing the number of layers by one, and
repeating optimizing a plurality of times.

6. The method according to claim 5, wherein the plurality of times comprises repeating until error improvement in the optimization is deemed marginal.

7. The method according to claim 1, wherein the assigning initial values comprises using the data obtained from a source to provide approximations of at least some of the fundamental parameters using an underlying petrophysical model.

8. The method according to claim 1, wherein the assigning initial values comprises selecting a value from a predetermined range for a fundamental parameter of the fundamental parameters.

9. The method according to claim 1, wherein the fundamental parameters further include residual water ($S_{wr}$), maximum residual oil saturation ($S_{nrm}$), cementation exponent (m), saturation exponent (n), Corey exponent ($\lambda_{BC}$), and pore aspect ratio ($\eta$).

10. The method according to claim 9, wherein the field variables include pressure, saturation, temperature, and fluid composition, and the physical response-relevant properties include an electrically-based property, a density-based property, a acoustically-based property, and a nuclear-based property.

11. The method according to claim 10, further comprising determining values for predetermined set of fundamental parameters for the plurality of layers of the formation from the modifying, and displaying the determined values for the predetermined set of fundamental parameters.

12. The method according to claim 11, wherein the displaying comprises presenting the values for a of the predetermined set of fundamental parameters as a depth or azimuth log.

13. The method according to claim 10, further comprising determining values for the plurality of field variables from the modifying, and displaying the determined values for a of the plurality of field variables.

14. The method according to claim 13, wherein the displaying comprises presenting the determined values of the plurality of field variables as a depth or azimuth log.

15. The method according to claim 1, further comprising using the characterization of the earth formation to predict how the earth formation will respond to disturbances or stimuli, and displaying a prediction.

16. The method according to claim 15, wherein the disturbances or stimuli include fluid injection for production of hydrocarbons, carbon-dioxide injection for sequestration, current injection for characterization of the earth formation, or a combination thereof.

17. The method according to claim 9, wherein the fundamental parameters further include permeability (k) and a of a dimensionless form of entry capillary pressure ($J_b$) and a proportionality constant $\{\tilde{C}\}$.

18. The method according to claim 1, wherein the fundamental parameters further include a volume exponent ($\upsilon$), coordination number ($z_c$), T2 distribution ($g_{T\,2}$ ($T_2$), and NMR surface relaxivity ($\rho_r$).

19. The method according to claim 18, wherein the fundamental parameters further include a pore aspect ratio ($\eta$).

20. A method of characterizing an earth formation, comprising:
a) constructing a reservoir model of the earth formation from data obtained from a plurality of sources, the reservoir model including a plurality of layers;
b) selecting a predetermined set of fundamental parameters to describe the earth formation, including porosity ($\phi$), pore-to-throat size ratio ($\alpha$), cation-exchange capacity ($Q_v$), a mineral array (M), residual water ($S_{wr}$), maximum residual oil saturation ($S_{nrm}$), cementation exponent (m), saturation exponent (n), Corey exponent ($\lambda_{BC}$), and pore aspect ratio ($\eta$);
c) assigning initial values for the predetermined set of fundamental parameters for each of the plurality of layers;
d) using the initial values for each of the plurality of layers, solving partial differential equations of transport to obtain solutions for a plurality of field variables of the earth formation including pressure, saturation, temperature, and fluid composition as a function of space and time for each of the plurality of layers;
e) computing physical-response-relevant properties as a function of space and time for each of the plurality of layers using the solutions;
f) computing tool responses using the physical-response-relevant properties including a electrically-based property, a density-based property, a acoustically-based property, and a nuclear-based property;
g) installing an electrode array between an insulation portion of a metal casing provided in a borehole and a physical formation and obtaining formation measurement information from the electrode array, wherein the borehole is a partly conductive fluid-filled borehole;
h) comparing the formation measurement information to the computed tool response to obtain an error signal;
i) modifying the initial values in an iterative process utilizing the error signal and repeating d) with modified values, e), f), g), h), and i) in a multidimensional search until the error signal is deemed acceptable, thereby characterizing the earth formation;
j) determining values for the predetermined set of fundamental parameters for the plurality of layers of the formation; and
k) displaying the determined values for a of the predetermined set of fundamental parameters.

* * * * *

UNITED STATES PATENT AND TRADEMARK OFFICE
CERTIFICATE OF CORRECTION

PATENT NO.         : 10,329,903 B2
APPLICATION NO.    : 14/777131
DATED              : June 25, 2019
INVENTOR(S)        : Terizhandur S. Ramakrishnan et al.

Page 1 of 1

It is certified that error appears in the above-identified patent and that said Letters Patent is hereby corrected as shown below:

On the Title Page

Item (54) The title is corrected from "METHODS OF CHARACTERIZING EARTH FORMATIONS USING PHYSIOCHEMICAL MODEL" to -- METHODS OF CHARACTERIZATION EARTH FORMATIONS USING PHYSICOCHEMICAL MODEL --.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*